United States Patent
Onishi

(10) Patent No.: US 10,756,581 B2
(45) Date of Patent: Aug. 25, 2020

(54) CONTROL DEVICE, POWER RECEIVING DEVICE, ELECTRONIC APPARATUS, POWER TRANSMISSION SYSTEM, AND POWER SUPPLY METHOD

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 557 days.

(21) Appl. No.: 15/429,847

(22) Filed: Feb. 10, 2017

(65) Prior Publication Data
US 2017/0237277 A1 Aug. 17, 2017

(30) Foreign Application Priority Data
Feb. 12, 2016 (JP) ................... 2016-24880

(51) Int. Cl.
- H02J 50/90 (2016.01)
- H02J 7/02 (2016.01)
- H02J 50/80 (2016.01)
- H02J 50/12 (2016.01)
- H02J 7/04 (2006.01)

(52) U.S. Cl.
CPC .......... H02J 50/90 (2016.02); H02J 7/025 (2013.01); H02J 7/042 (2013.01); H02J 50/12 (2016.02); H02J 50/80 (2016.02)

(58) Field of Classification Search
CPC .................. H02J 7/00; H02J 50/00

USPC .......................................................... 307/104
See application file for complete search history.

(56) References Cited

U.S. PATENT DOCUMENTS

| | | | |
|---|---|---|---|
| 8,026,694 B2 * | 9/2011 | Kamijo | H02J 5/005 320/108 |
| 8,054,036 B2 | 11/2011 | Onishi et al. | |
| 2008/0100272 A1 * | 5/2008 | Yoshio | H02M 3/07 323/266 |
| 2008/0197804 A1 * | 8/2008 | Onishi | H02J 50/90 320/108 |
| 2008/0211455 A1 * | 9/2008 | Park | H02J 50/80 320/108 |
| 2009/0174264 A1 * | 7/2009 | Onishi | H02J 50/90 307/104 |
| 2009/0174364 A1 * | 7/2009 | Onishi | H02J 50/60 320/108 |
| 2009/0322280 A1 * | 12/2009 | Kamijo | H02J 50/80 320/108 |
| 2014/0245464 A1 * | 8/2014 | Chu | H02J 50/10 726/35 |

(Continued)

FOREIGN PATENT DOCUMENTS

| JP | 2008-206232 A | 9/2008 |
|---|---|---|
| JP | 2009-011129 A | 1/2009 |

Primary Examiner — Rexford N Barnie
Assistant Examiner — Joseph N Inge
(74) Attorney, Agent, or Firm — Oliff PLC

(57) ABSTRACT

In the case where it is detected that a power receiving device has been removed from a power transmitting device, a control device turns on a power supply operation of a power supply portion when an operation mode is set to a first mode, and turns off the power supply operation of the power supply portion when the operation mode is set to a second mode.

15 Claims, 25 Drawing Sheets

(56) References Cited

U.S. PATENT DOCUMENTS

2014/0253052 A1* 9/2014 Goma .................... H02J 50/80
  320/166
2016/0311094 A1* 10/2016 Mergener ................. B25F 5/00
2016/0336774 A1* 11/2016 Onishi .................... H02J 50/12

* cited by examiner

CHARGE PERIOD

PATTERN PT1 ⇒ LOGIC LEVEL "1"

PATTERN PT2 ⇒ LOGIC LEVEL "0"

| 16bit | 16bit | 16bit | 16bit |
|---|---|---|---|
| 0000h | (1) DATA CODE + RECTIFICATION VOLTAGE | (2)(3)(4)(5)(6)(7)(8) | (9)CRC |

FIG. 21A

| | bit15                                                                                                                                  bit0 |
|---|---|
| (1) | DATA CODE        RECTIFICATION VOLTAGE |
| (2) | TEMPERATURE |
| (3) | BATTERY VOLTAGE |
| (4) | BATTERY CURRENT |
| (5) | STATUS FLAG |
| (6) | NUMBER OF CYCLES |
| (7) | IC NUMBER, CHARGING EXECUTION, OFF START |
| (8) | ID |
| (9) | CRC |

FIG. 21B

CONTROL DEVICE, POWER RECEIVING DEVICE, ELECTRONIC APPARATUS, POWER TRANSMISSION SYSTEM, AND POWER SUPPLY METHOD

CROSS-REFERENCE TO RELATED APPLICATION

This application claims priority from Japanese patent application JP 2016-024880 filed Feb. 12, 2016, which is incorporated herein by reference in its entirety.

BACKGROUND

1. Technical Field

The present invention relates to a control device, a power receiving device, an electronic apparatus, a power transmission system, a power supply method, and the like.

2. Related Art

In a power transmission system including a power transmitting device and a power receiving device, power transmitted by the power transmitting device is received by a power receiving portion of the power receiving device, and the power receiving device supplies power to a load based on the received power. For example, technologies disclosed in JP-A-2008-206232 and JP-A-2009-11129 are known technologies of a contactless power transmission system. The contactless power transmission system uses electromagnetic induction or the like, and enables power transmission even without a contact with a metal portion. Power supply to electronic apparatuses such as household appliances, mobile information terminals, and electric cars is proposed as an application example of the contactless power transmission system.

For example, in JP-A-2008-206232, a method is disclosed in which power saving power transmission is performed when full charge is detected so as to enable recharging of a battery. In JP-A-2009-11129, a method is disclosed in which a switch is provided on a power transmitting device side, and provisional power transmission for authentication is performed based on an operation on the switch.

The known technology disclosed in JP-A-2008-206232 is to reduce power consumption by using appropriate power transmission control, but reduction of power consumption after removal of the power receiving device has been detected or the like is not disclosed.

SUMMARY

According to some aspects of the invention, a control device, a power receiving device, an electronic apparatus, a power transmission system, a power supply method, and the like that can realize appropriate power supply control when discharge power discharged from a battery is supplied to a power supply target can be provided.

One aspect of the invention relates to a control device that is to be included in a power receiving device that receives power supplied from a power transmitting device. The control device includes: a power supply portion that charges a battery based on received power received by a power receiving portion in the power receiving device, and performs a power supply operation in which power is supplied to a power supply target based on discharge power discharged from the battery; and a control portion that controls the power supply portion. The control portion has a first mode and a second mode as operation modes for controlling the power supply operation of the power supply portion, and in a case where it is detected that the power receiving device has been removed from the power transmitting device, the control portion 1) turns on the power supply operation of the power supply portion when the operation mode is set to the first mode, and 2) turns off the power supply operation of the power supply portion when the operation mode is set to the second mode.

In one aspect of the invention, power supply operation to a power supply target is performed based on discharge power discharged from the battery, along with charging of the battery being performed based on received power received by the power receiving portion from the power transmitting device. Also, the control portion has the first mode and the second mode as operation modes. In the first mode, when it is detected that the power receiving device has been removed from the power transmitting device, the power supply operation of the power supply portion is turned on. Accordingly, the discharge power discharged from the battery can be supplied to the power supply target. On the other hand, in the second mode, when it is detected that the power receiving device has been removed from the power transmitting device, the power supply operation of the power supply portion is turned off. Accordingly, wasteful consumption of power can be suppressed in a removed period in which the power receiving device is removed. Therefore, appropriate power supply control in the case where the discharge power discharged from the battery is supplied to the power supply target can be realized.

Also, in one aspect of the invention, the control portion may turn off the power supply operation of the power supply portion in a charge period in which the battery is charged based on the received power.

In this way, wasteful power consumption as a result of the power supply operation of the power supply portion being performed in the charge period in which the battery is charged can be suppressed.

Also, in one aspect of the invention, the control device includes a monitoring portion that monitors an operation state of a switch portion. The control portion may switch the power supply operation from on to off or off to on, based on a result of monitoring the operation state of the switch portion, in a removed period in which the power receiving device is removed from the power transmitting device.

In this way, in a removed period in which the power receiving device is removed, the power supply operation can be switched from on to off or off to on with an operation on the switch portion, and thus appropriate power supply control in the removed period can be realized.

Also, in one aspect of the invention, at least the second mode may be set as the operation mode by an external device that is different from the power transmitting device and the power transmitting device.

In this way, a setting is enabled in which the operation mode of the control portion is set to the second mode using the power transmitting device or an external device, and the power supply operation is turned off when removal of the power receiving device is detected.

Also, in one aspect of the invention, the control device may include a communication portion that transmits notification information for notifying the power transmitting device or the external device which of the first mode and the second mode the operation mode is set to.

In this way, the power transmitting device or an external device can be caused to perform various types of processing and control by being notified which of the first and second modes the operation mode is set to.

Also, in one aspect of the invention, the control portion includes a setting register that stores a setting indicating which of the first mode and the second mode the operation mode is set to. The setting register may be supplied with a power supply voltage that is based on a battery voltage of the battery so as to operate.

In this way, in the removed period in which the power receiving device is removed, the power supply voltage based on the battery voltage is supplied to the setting register, and setting indicating which of the first mode and the second mode the operation mode is set to can be held in the setting register.

Also, in one aspect of the invention, the power supply portion may charge the battery based on the received power contactlessly received from the power transmitting device.

In this way, power supply control appropriate for a control device included in a power receiving device in contactless power transmission can be realized.

Also, in one aspect of the invention, the power supply portion may include a charging portion that charges the battery based on the received power, and a discharging portion that performs an operation of discharging the battery and supplies the discharge power discharged from the battery to the power supply target.

In this way, the power supply target can be operated by performing a discharging operation such that discharge power discharged from a battery is supplied to the power supply target, along with charging the battery based on the power received from the power transmitting device being performed.

Also, in one aspect of the invention, the control portion includes a charging system control portion that is supplied with a power supply voltage that is based on an output voltage of the power receiving portion so as to operate, and a discharging system control portion that is supplied with a power supply voltage that is based on a battery voltage of the battery, and the discharging system control portion may control the discharging operation of the discharging portion.

In this way, even in a removed period in which the power receiving device is removed, supplying the power supply voltage that is based on the battery voltage to the discharging system control portion causes the discharging system to perform discharge control.

Also, in one aspect of the invention, the control portion stops the discharging operation by turning off the discharging operation of the discharging portion when landing of the power receiving device is detected, turns off the discharging operation of the discharging portion in a normal power transmission period in which the power transmitting device performs normal power transmission, and in a case where the operation mode is set to the first mode, may start the discharging operation by turning on the discharging operation of the discharging portion when removal of the power receiving device is detected.

In this way, wasteful power consumption due to discharging power of the battery in the normal power transmission period in which the battery is charged can be suppressed. Also, in the case where the first mode is set, discharge power discharged from the battery can be supplied to the power supply target so as to operate by turning on the discharging operation when removal of the power receiving device is detected.

Also, in one aspect of the invention, the control portion, in a case where the operation mode is set to the first mode, may start the discharging operation by turning on the discharging operation of the discharging portion after a start-up period of the discharging operation has elapsed, the start-up period being initiated by a decrease in an output voltage of the power receiving portion.

In this way, even when the output voltage of the power receiving portion has decreased, the discharging operation of the battery cannot be performed until the start-up period of the discharging operation has elapsed. When the start-up period has elapsed, discharge power discharged from the battery is supplied to the power supply target. Accordingly, a situation in which the battery is unnecessarily discharged and recharging is performed more than necessary can be suppressed. Also, power saving can be realized as a result of the battery not unnecessarily discharging power.

Also, in one aspect of the invention, the control portion starts discharging of a capacitor that is charged based on the received power received by the power receiving portion when the output voltage of the power receiving portion has decreased below a judgement voltage, and may start the discharging operation of the discharging portion when a charge voltage of the capacitor has decreased below a threshold voltage.

In this way, when power reception by the power receiving portion has stopped and the output voltage of the power receiving portion has decreased below the judgement voltage, measurement of the start-up period can be started. When the start-up period has elapsed, the discharging operation of the discharging portion is started, and the discharge power discharged from the battery can be supplied to the power supply target.

Also, in one aspect of the invention, the power transmitting device performs intermittent power transmission for removal detection, and the start-up period may be longer than an interval between periods of the intermittent power transmission for removal detection.

In this way, the intermittent power transmission for removal detection and the start of the discharging operation of the battery initiated upon the start-up period elapsing can both be realized.

Also, in one aspect of the invention, the control portion, in a case where the power transmitting device succeeded in landing detection and has made a response to the power receiving device, may set the operation mode to the second mode based on the response.

In this way, the discharging operation can be turned off when removal of the power receiving device is detected by setting the operation mode to the second mode based on a response that the power transmitting device succeeded in landing detection makes to the power receiving device.

Also, in one aspect of the invention, the control device includes a load modulation portion that transmits communication data to the power transmitting device through load modulation. The load modulation portion may transmit notification information for notifying the power transmitting device which of the first mode and the second mode the operation mode is set to, as the communication data.

In this way, the power transmitting device can be caused to perform various types of processing and control by being notified which of the first and second modes the operation mode is set to.

Another aspect of the invention relates to a power receiving device including the control device according to any of the above descriptions.

Another aspect of the invention relates to an electronic apparatus including the control device according to any of the above descriptions.

Another aspect of the invention relates to a power transmission system including a power transmitting device and a power receiving device. The power transmitting device transmits power to the power receiving device. The power receiving device charges a battery based on received power received by a power receiving portion in the power receiving device, and performs a power supply operation in which power is supplied to a power supply target based on discharge power discharged from the battery. The power receiving device has a first mode and a second mode as operation modes for controlling the power supply operation of the power receiving device. In a case where it is detected that the power receiving device has been removed from the power transmitting device, the power receiving device 1) turns on the power supply operation when the operation mode is set to the first mode, and 2) turns off the power supply operation when the operation mode is set to the second mode.

According to another aspect of the invention, in the first mode, when it is detected that the power receiving device has been removed from the power transmitting device, the power supply operation of the power supply portion is turned on. Accordingly, discharge power discharged from the battery can be supplied to the power supply target. On the other hand, in the second mode, when it is detected that the power receiving device has been removed from the power transmitting device, the power supply operation of the power supply portion is turned off. Accordingly, in a removed period in which the power receiving device is removed, wasteful power consumption can be suppressed.

Another aspect of the invention relates to a power supply method including: receiving power from a power transmitting device; charging a battery based on received power received from the power transmitting device; performing a power supply operation in which power is supplied to a power supply target based on discharge power discharged from the battery; and a first mode and a second mode being provided as operation modes for controlling the power supply operation, and in a case where it is detected that a power receiving device has been removed from the power transmitting device, turning on the power supply operation when the operation mode is set to the first mode, and turning off the power supply operation when the operation mode is set to the second mode.

BRIEF DESCRIPTION OF THE DRAWINGS

The invention will be described with reference to the accompanying drawings, wherein like numbers reference like elements.

FIG. 21A is an example of a format of communication data.

FIG. 21B is an example of the format of the communication data.

DESCRIPTION OF EXEMPLARY EMBODIMENTS

Hereinafter, a preferable embodiment of the invention will be described in detail. Note that the embodiment described below is not intended to unduly limit the content of the invention described in the scope of the claims, and not all configurations described in this embodiment are necessarily essential as solving means of the invention.

Figure 1:
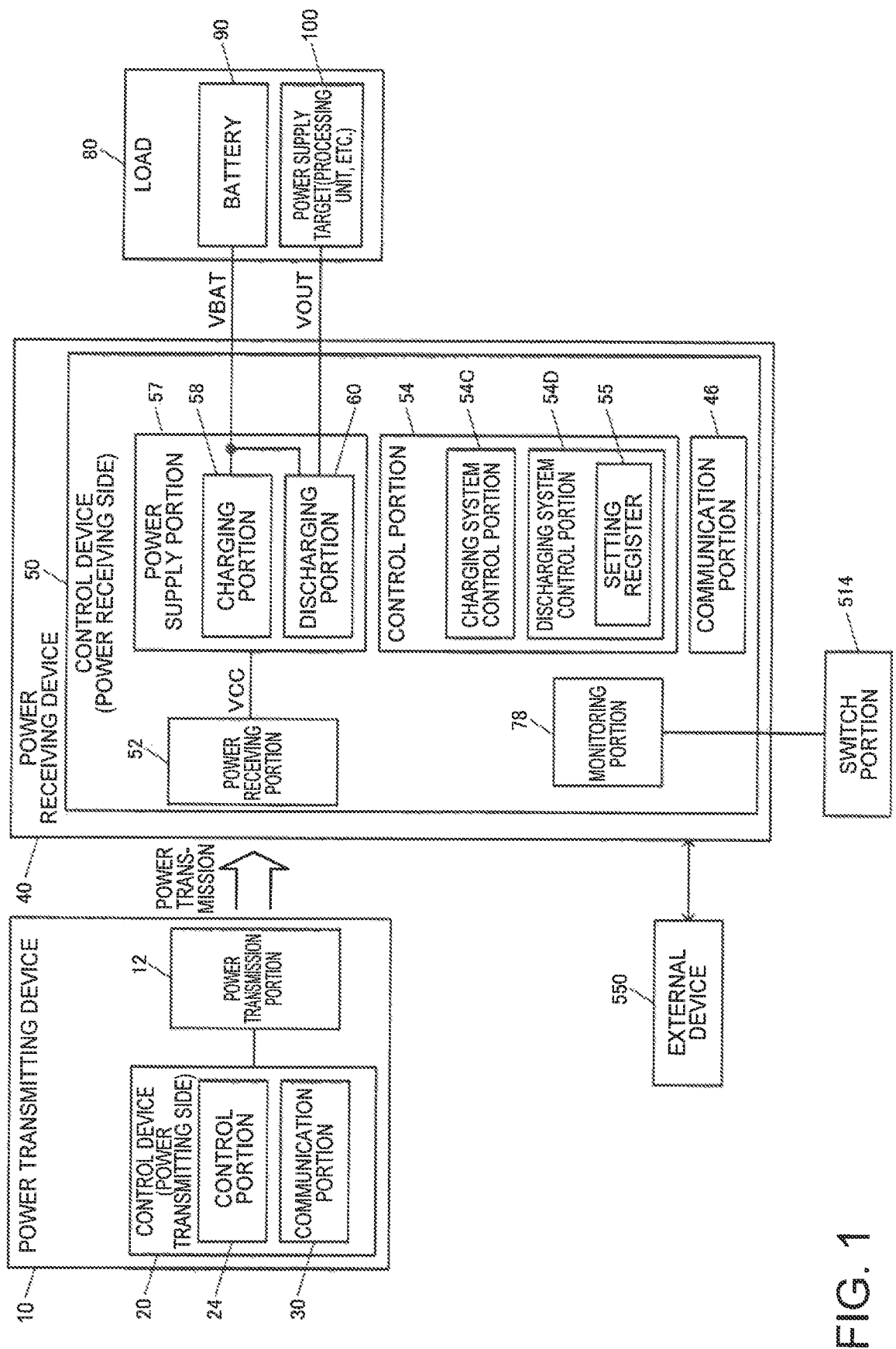
FIG. 1 is an exemplary configuration of a control device, a power transmitting device, and a power receiving device of a present embodiment.

1. Configurations of Power Transmitting Device, Power Receiving Device, and Control Device An exemplary configuration of control devices 20 and 50 of the present embodiment and the power transmitting device 10 and the power receiving device 40 that respectively includes the control devices 20 and 50 is shown in FIG. 1. Note that the configuration of these devices is not limited to the configuration in FIG. 1, and various modifications can be implemented such as omitting a portion of the constituent elements, adding another constituent element (a reporting portion, for example), or changing a connection relationship.

The power transmitting device 10 is included in an electronic apparatus on a power transmitting side. The electronic apparatus on the power transmitting side is a charger or various apparatuses having a power transmission function, for example. The power receiving device 40 is included in an electronic apparatus on a power receiving side. The electronic apparatus on the power receiving side is a hearing aid, a wearable apparatus, a mobile information terminal, or the like, for example. A power transmission system in which power is transmitted from the power transmitting device 10 to the power receiving device 40 is realized by the power transmitting device 10 and the power receiving device 40. Note that the power transmission from the power transmitting device 10 to the power receiving device 40 may be the later-described contactless power transmission (wireless power transmission) or contact power transmission (wired power transmission) using a cable, a connector, or the like.

The power transmitting device 10 (power transmission module, primary module) includes a power transmission portion 12 and a control device 20. The power transmission portion 12 is a circuit that transmits power to the power receiving device 40, and can be realized by a power transmission driver or the like. The control device 20 performs various control on the power transmitting side, and is realized by an integrated circuit device (IC) or the like. The control device 20 includes a control portion 24 and a communication portion 30. Note that a modification in which the power transmission portion 12 is incorporated in the control device 20 or the like can be implemented.

The control portion 24 executes various types of control processing of the power transmitting side control device 20. For example, the control portion 24 controls the power transmission portion 12 and the communication portion 30. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs processing for detecting and receiving communication data from the power receiving device 40.

The power receiving device 40 (power receiving module, secondary module) includes the control device 50. The control device 50 performs various types of control on the power receiving side, and can be realized by an integrated circuit device (IC) or the like. The control device 50 includes a power receiving portion 52, a control portion 54, and a power supply portion 57. Also, the control device 50 can include a communication portion 46 and a monitoring portion 78. Note that a modification in which the power receiving portion 52 is provided external to the control device 50 or the like can be implemented.

The power receiving portion 52 receives power from the power transmitting device 10. For example, the power receiving portion 52 converts an AC voltage to a DC rectified voltage (VCC), and outputs the DC rectified voltage.

The power supply portion 57 supplies power to the load 80 based on the power received by the power receiving portion 52. For example, the power supply portion 57 charges the battery 90 by supplying power received by the power receiving portion 52.

The power supply portion 57 can include a charging portion 58 and a discharging portion 60. The charging portion 58 performs charging (charging control) of the battery 90. For example, the charging portion 58 is supplied with a voltage that is based on an output voltage VCC (rectification voltage, DC voltage) of the power receiving portion 52, and charges the battery 90. The discharging portion 60 performs a discharging operation of the battery 90. For example, the discharging portion 60 performs the discharging operation of the battery 90, and supplies the discharge power discharged from the battery 90 to the power supply target 100. The power supply portion 57 is not limited to the configuration in which the charging portion 58 and the discharging portion 60 are included.

The control portion 54 performs various types of control processing of the control device 50 on the power receiving side. For example, the control portion 54 controls the communication portion 46 and the power supply portion 57 (charging portion, discharging portion). Also, the control portion 54 can control the power receiving portion 52 and the monitoring portion 78. The control portion 54 can be realized by a logic circuit such as a gate array that is generated by an automated place-and-route method, or various processors such as a microcomputer, for example.

The control portion 54 includes a charging system control portion 54C (first control portion) and a discharging system control portion 54D (second control portion). The charging system control portion 54C performs control on circuits in a charging system that operate with a power supply voltage based on the output voltage VCC of the power receiving portion 52, for example. The discharging system control portion 54D performs control on circuits in a discharging system that operate with a power supply voltage based on a battery voltage VBAT, for example. The discharging system control portion 54D includes a setting register 55 in which information for controlling the discharging system is set and stored.

The communication portion 46 performs communication in which communication data is transmitted to the power transmitting device 10. Alternatively, the communication portion 46 may perform communication in which communication data is received from the power transmitting device 10. For example, in the case of contactless power transmission, the communication portion 46 performs communication processing by using load modulation, but may perform communication using a method, other than load modulation, such as proximity wireless communication including RF, for example.

The monitoring portion 78 is a circuit that monitors the operation state of a switch portion 514. For example, the monitoring portion 78 monitors an off operation and an on operation performed by using the switch portion 514, for example. The switch portion 514 is an operation device that is operated by a user, and is provided in an electronic apparatus in which the power receiving device 40 is incorporated, for example.

The load 80 includes the battery 90 and the power supply target 100. The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in an electronic apparatus in which the power receiving device 40 is incorporated, and is a power supply target of the battery 90, for example.

In the present embodiment, the control device 50 (receiving side control device) included in the power receiving device 40 that receives power supplied from the power transmitting device 10 includes the power supply portion 57 and the control portion 54 that controls the power supply portion 57. The power supply portion 57 charges the battery 90 based on received power that is received by the power receiving portion 52 in the power receiving device 40. For example, the power supply portion 57 performs control of charging the battery 90 based on the output voltage VCC (rectification voltage) from the power receiving portion 52. Also, the power supply portion 57 supplies power to the power supply target 100 based on discharge power discharged from the battery 90. For example, the power supply portion 57 supplies an output voltage VOUT that is based on the battery voltage VBAT that is the voltage of the battery 90 to the power supply target 100 that is a device such as a processing portion included in an electronic apparatus on the power receiving side. The output voltage VOUT is a voltage resulting from voltage-converting (stepping down, for example) the battery voltage VBAT.

The control portion 54 has a first mode and a second mode as operation modes for controlling the power supply operation of the power supply portion 57. The setting of the first or second mode is performed by the setting register 55, for example. When it is detected that the power receiving device 40 has been removed from the power transmitting device 10, in the case where the operation mode is set to the first mode, the control portion 54 turns on (enables) the power supply operation of the power supply portion 57. That is, in the case where the operation mode of the power supply operation is set to the first mode, the control portion 54 turns on the power supply operation of the power supply portion 57 when removal of the power receiving device 40 is detected. On the other hand, in the case where the operation mode is set to the second mode, when it is detected that the power receiving device 40 has been removed from the power transmitting device 10, the control portion 54 turns off (disables) the power supply operation of the power supply portion 57. That is, in the case where the operation mode of the power supply operation is set to the second mode, the control portion 54 turns off the power supply operation of the power supply portion 57 when removal of the power receiving device 40 is detected.

Here, the state in which the power receiving device 40 is removed from the power transmitting device 10 is a state in which the path of contactless (wireless) or contact (wired) power transmission is cut off, and is a state in which an electronic apparatus (such as a hearing aid, a wearable apparatus, or a mobile information terminal) on the power receiving side is removed (detached) from an electronic apparatus (such as a charger) on the power transmitting side, for example. The removal detection can be realized by detecting lowering of the output voltage VCC of the power receiving portion 50, or the like, for example.

Also, the first and the second modes are operation modes (operation modes of the control device 50) in the power supply operation of the power supply portion 57, and the setting information thereof is stored in the setting register 55, for example. For example, the first mode is a normal operation mode, and in the normal operation mode, when removal of the power receiving device 40 is detected, the power supply operation of the power supply portion 57 is turned on and the power supply operation is started. Accordingly, the discharge power discharged from the battery 90 is supplied to the power supply target 100, and the normal operation of the power supply target 100 (normal operation of an electronic apparatus on the power receiving side) is enabled. On the other hand, the second mode is an off-start mode of the power supply operation. In the off-start mode, when removal of the power receiving device 40 is detected, the power supply operation is turned off, and the discharge power discharged from the battery 90 is not supplied to the power supply target 100. Accordingly, wasteful power consumption is suppressed, and low power consumption can be realized.

Also, the control portion 54 turns off the power supply operation of the power supply portion 57 in a charge period (normal power transmission period, for example) in which the battery 90 is charged based on power received by the power receiving portion 52. That is, in the charge period, the power supply operation of the power supply portion 57 is turned off, and the power discharged from the battery 90 is not supplied to the power supply target 100. Accordingly, wasteful power consumption during charging can be suppressed. When removal of the power receiving device 40 is detected during charging or after charging has finished (after being fully charged), in the first mode, the power supply operation that has been turned off is automatically turned on, and supply of the discharge power discharged from the battery 90 to the power supply target 100 starts. Accordingly, the normal operation of the power supply target 100 is enabled. On the other hand, when removal of the power receiving device 40 is detected during charging or after charging has finished, in the second mode, the power supply operation that has been turned off is kept in the off state. Accordingly, power saving in the period in which power receiving device 40 is removed can be realized.

Also, the control device 50 includes the monitoring portion 78, and the monitoring portion 78 monitors (detects) the operation state (such as an on operation, an off operation, or a switching operation) of the switch portion 514 (operation portion). The control portion 54 (discharging system control portion 54D), in a period in which the power receiving device 40 is removed from the power transmitting device 10, switches the power supply operation from on to off or from off to on based on a result of monitoring the operation state of the switch portion 514 (monitoring result signal from the monitoring portion).

For example, in the first mode, the power supply operation of the power supply portion 57 is on when removal is detected, and thereafter, when an operation made by using the switch portion 514 (switching operation, off operation) is detected by the monitoring portion 78, the power supply operation is switched from on to off. Thereafter, in the case where an operation made by using the switch portion 514 is detected, the power supply operation is switched from off to on. Also, in the second mode, the power supply operation when removal is detected is off, and thereafter, when an operation made by using the switch portion 514 is detected by the monitoring portion 78, the power supply operation is switched from off to on. Thereafter, when an operation by using the switch portion 514 is detected, the power supply operation is switched from on to off.

Also, at least the second mode is set as the operation mode in the control device 50 by the power transmitting device 10 (power transmitting side control device 20). Note that at least the second mode may be set as the operation mode by an external device 550 that is different from the power transmitting device 10. The external device 550 is a device (such as a PC or a mobile information terminal, for example) that is used as a device separate from the power transmitting device 10. Also, the first mode may be set as the operation mode by the power transmitting device 10 or the external device 550. Also, the setting of the operation mode by the power transmitting device 10 or the external device 550 to the setting register 55, for example, is performed based on communication between the power transmitting device 10 or the external device 550 and the control device 50 (response from the power transmitting side).

Also, the communication portion 46 communicates with the power transmitting device 10 or the external device 550 to transmit communication data. The communication portion 46 transmits notification information notifying the power transmitting device 10 or the external device 550 which of the first mode and the second mode the operation mode is set to, as the communication data. Note that the notification information needs only be information that causes the power transmitting device 10 or the external device 550 to at least recognize that the operation mode is set to the second mode. For example, the notification information is flag information or the like notifying that the off-start mode, which is the second mode, is set. The power transmitting device 10 or the external device 550 that has received the notification information desirably reports that the second mode (off-start) is set using a reporting portion (reporting device) such as an LED using light, sound, or an image.

Also, the setting register 55 stores a setting indicating which of the first mode and the second mode is set as the operation mode. For example, in the case where the first mode is set in the setting register 55 as a result of the communication (response) with the power transmitting device 10 or the external device 550, when removal of the power receiving device 40 is detected, the power supply operation of the power supply portion 57 is turned on, and in the case where the second mode is set in the setting register 55, when removal of the power receiving device 40 is detected, the power supply operation of the power supply portion 57 is turned off.

The setting register 55 is supplied with a power supply voltage that is based on the battery voltage VBAT of the battery 90 (VBAT itself or a voltage resulting from regulating the VBAT) so as to operate. For example, the setting register 55 can be realized by a flip-flop or the like. In the case where the flip-flop stores a first logic level ("1", for example), the operation mode is set to the second mode, and in the case of storing a second logic level ("0", for example), the operation mode is set to the first mode.

The power supply portion 57 can include the charging portion 58 and the discharging portion 60. The charging portion 58 charges the battery 90 based on power received by the power receiving portion 52. The discharging portion 60 performs a discharging operation of the battery 90, and supplies discharge power discharged from the battery 90 to the power supply target 100. The control portion 54 controls the discharging portion 60. Specifically, the discharging system control portion 54D that operates with a power supply voltage that is based on the battery voltage VBAT controls the discharging portion 60 (and the monitoring portion 78). Note that the charging portion 58 is controlled by the charging system control portion 54C that operates with a power supply voltage that is based on the output voltage VCC of the power receiving portion 52.

Also, the control portion 54 includes the charging system control portion 54C and the discharging system control portion 54D. The charging system control portion 54C is supplied with the power supply voltage that is based on the output voltage VCC of the power receiving portion 52 so as to operate. For example, the charging system control portion 54C is supplied with a power supply voltage that is obtained by regulating the output voltage VCC by using a regulator so as to operate, for example. Circuits in the charging system such as the charging portion 58 and the power receiving portion 52 are controlled by the charging system control portion 54C so as to operate.

The discharging system control portion 54D is supplied with a power supply voltage (VBAT itself or a voltage resulting from regulating VBAT) that is based on the battery voltage VBAT so as to operate. For example, circuits in the discharging system such as the discharging portion 60 and the monitoring portion 78 are controlled by the discharging system control portion 54D so as to operate.

2. Method of Present Embodiment

Next, a method of the present embodiment will be described. Note that hereinafter, the power supply operation for supplying power to the power supply target 100 based on discharge power discharged from the battery 90 will be referred to as a discharging operation, as appropriate. That is, the power supply operation of the power supply portion 57 that is based on the discharge power discharged from the battery 90 will be referred to as the discharging operation of the discharging portion 60, as appropriate.

In the present embodiment, a method is adopted in which the discharging operation of the discharging portion 60 (power supply operation of the power supply portion 57) is started, with detection of removal of the power receiving device 40 as a trigger. For example, the discharging operation (power supply operation) of the discharging portion 60 is turned off during charging so as to suppress wasteful power consumption, and when removal is detected, the discharging operation (power supply operation) of the discharging portion 60 is turned on so as to supply power of the battery 90 to the power supply target 100.

However, in the case where the discharging operation is automatically started in this way, power consumption in a situation in which, although removal has been performed, an electronic apparatus (such as a hearing aid or a wearable apparatus) on the power receiving side is not in use needs to be considered. Typically, the power consumption in a period (hereinafter referred to as storage period) from when an electronic apparatus on the power receiving side is manufactured and shipped until use of the electronic apparatus starts.

From the viewpoint of a user who uses the electronic apparatus, it is desirable that the electronic apparatus can be used immediately after acquiring (purchasing) the electronic apparatus without performing charging. Therefore, a manufacturer or the like of the electronic apparatus ships the electronic apparatus in a state in which the battery has been charged as much as possible (in a state of full charge, in a narrow sense).

However, since the discharging portion 60 of the power receiving device 40 starts the operation with removal as a trigger, as described above, power of the battery 90 starts to be consumed as well. That is, because power consumption is similar to that during a normal operation, in the case where a large current such as several 10 s mA is output, for example, the power consumption increases, and it is highly possible that charging becomes insufficient during the storage period.

For example, in the case where a 4.2 V lithium battery is used as the battery 90 and the storage period is 22 months, the current value needs to be suppressed to approximately 0.2 μA during the storage period in order to not cause the electronic apparatus to become insufficiently charged after the storage period. In the case where the discharging operation with removal as a trigger is continued, it is very difficult to satisfy this condition.

A method is conceivable, for example, as a method of a comparative example, in which power consumption after shipment is suppressed by taking a measure such as a cell being separately packed or the contact of the cell being isolated by an insulating sheet, and the conditions of the storage period are satisfied. However, in the method of the comparative example, the number of processes increases, and user-friendliness decreases. Also, there is a problem in that safety needs to be considered in order to handle the cell separately.

Note that the situation in which the electronic apparatus is not used after removal is not limited to the aforementioned storage period. Various situations can be considered in which, although an electronic apparatus is removed from a charger including the power transmitting device 10, the use of the electronic apparatus is not envisioned such as a situation in which a user takes a long trip and the electronic apparatus will not be used during the trip. In this case, it is not preferable to force the user to perform work such as removing the cell or inserting an insulating sheet.

Figure 2A:
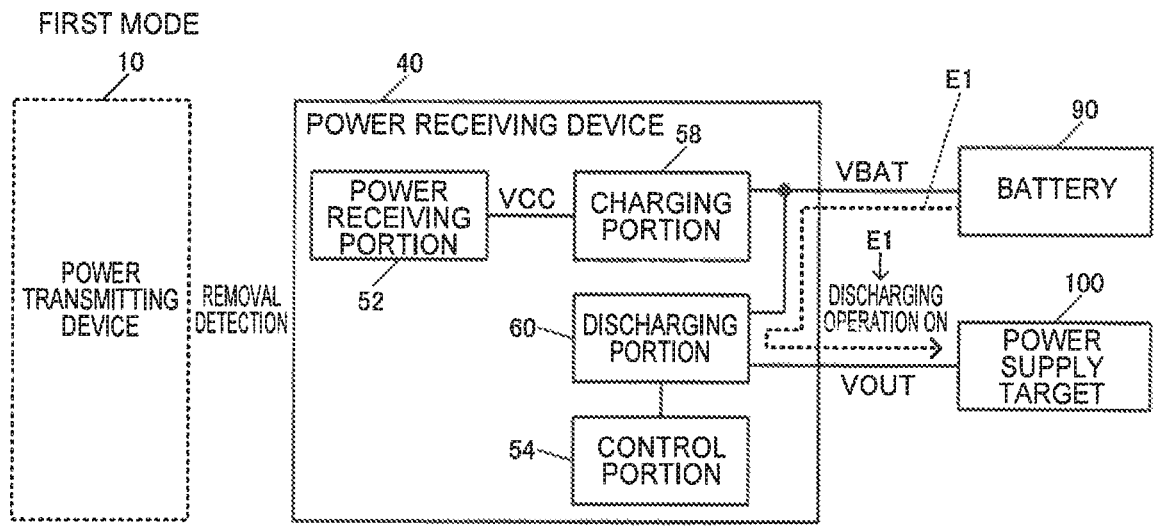
FIG. 2A is a diagram for describing a method of the present embodiment.

Therefore, in the present embodiment, in the first mode as shown in FIG. 2A, when removal of the power receiving device 40 from the power transmitting device 10 is detected, the discharging operation (power supply operation of the power supply portion 57) of the discharging portion 60 is turned on, as indicated in E1. For example, the first mode is a normal operation mode (operation mode of an apparatus in a normal state on the power receiving side), and in the normal operation mode, the discharging operation is started by turning on the discharging operation of the discharging portion 60 with removal of the power receiving device 40 as a trigger. Specifically, the discharging operation of the discharging portion 60 is off in a charge period (normal power transmission period) in which the battery 90 is charged, as shown in E2 in FIG. 2C. When removal is detected, the discharging operation is turned on, as shown in E1 in FIG. 2A. In this way, wasteful power consumption can be suppressed in the charge period, and thus a power transmission system appropriate for a type of electronic apparatus (such as a hearing aid or a wearable apparatus) that does not operate in the charge period in which the electronic apparatus on the power receiving side is placed on a charger.

Figure 2B:
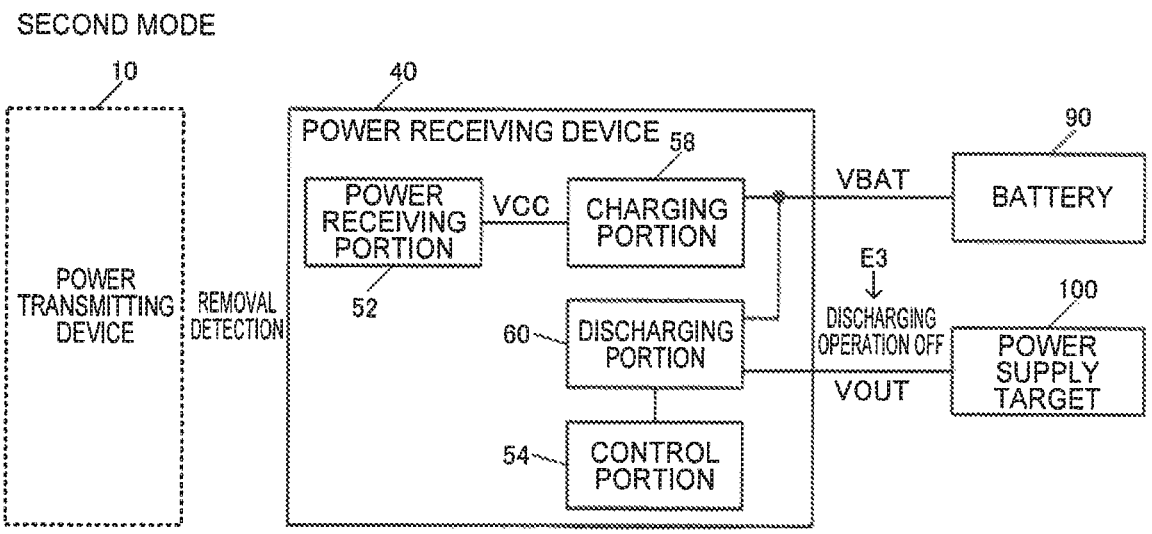
FIG. 2B is a diagram for describing the method of the present embodiment.
Figure 2C:
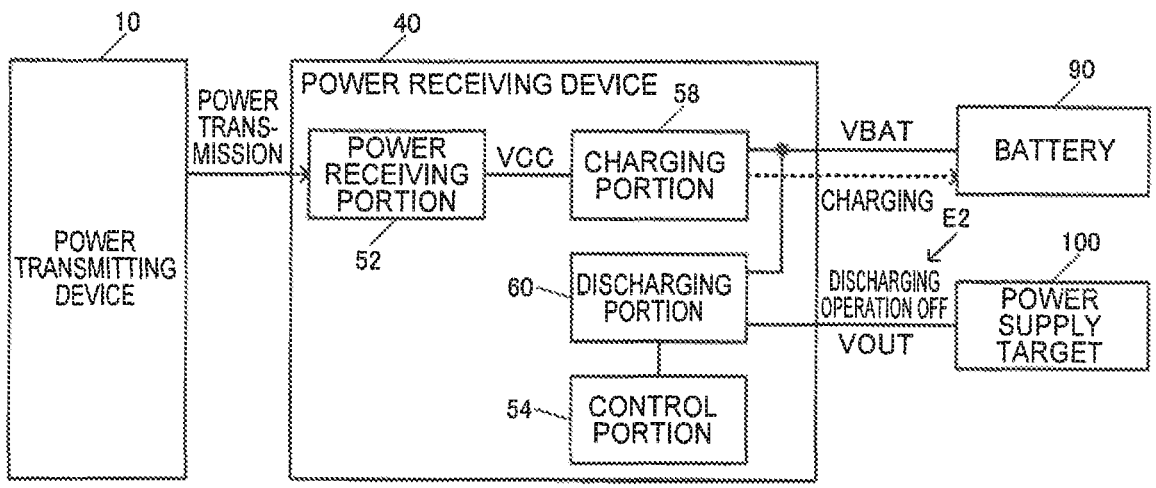
FIG. 2C is a diagram for describing the method of the present embodiment.

On the other hand, in the second mode as shown in FIG. 2B, when removal of the power receiving device 40 is detected, the discharging operation of the discharging portion 60 (power supply operation of the power supply portion 57) is turned off, as shown in E3. For example, the second mode is an off-start mode, and in the off-start mode, unlike the aforementioned normal operation mode, the discharging operation of the discharging portion 60 is turned off as well when removal of the power receiving device 40 is detected. That is, in the case where the discharging operation is turned off in the charge period as shown in FIG. 2C, in the off-start mode, the off state of the discharging operation is maintained even when removal is detected.

In this way, in the off-start mode (second mode, in a broad sense), in a removed period after removal detection as well, the discharging operation of the discharging portion 60 stays off, power is not discharged from the battery 90 to the power supply target 100, and thus the power consumption during the removed period is minimized. In the aforementioned example, a manufacturer or the like of an electronic apparatus sets the operation mode of the electronic apparatus to the off-start mode after the battery 90 is fully charged, and turns off the electronic apparatus, and then the electronic apparatus is shipped. In this way, even if the storage period is prolonged, since the discharging operation is off in the storage period, the power consumption during the storage period can be suppressed to a minimum. Accordingly, the user can use the electronic apparatus immediately after acquiring the electronic apparatus without charging, and the user-friendliness and the like can be improved.

Also, in the present embodiment, the monitoring portion 78 in FIG. 1 monitors the operation state of the switch portion 514. The control portion 54, in a period in which the power receiving device 40 is removed, switches the discharging operation from on to off or from off to on based on the result of monitoring the operation state of the switch portion 514.

Figure 3:
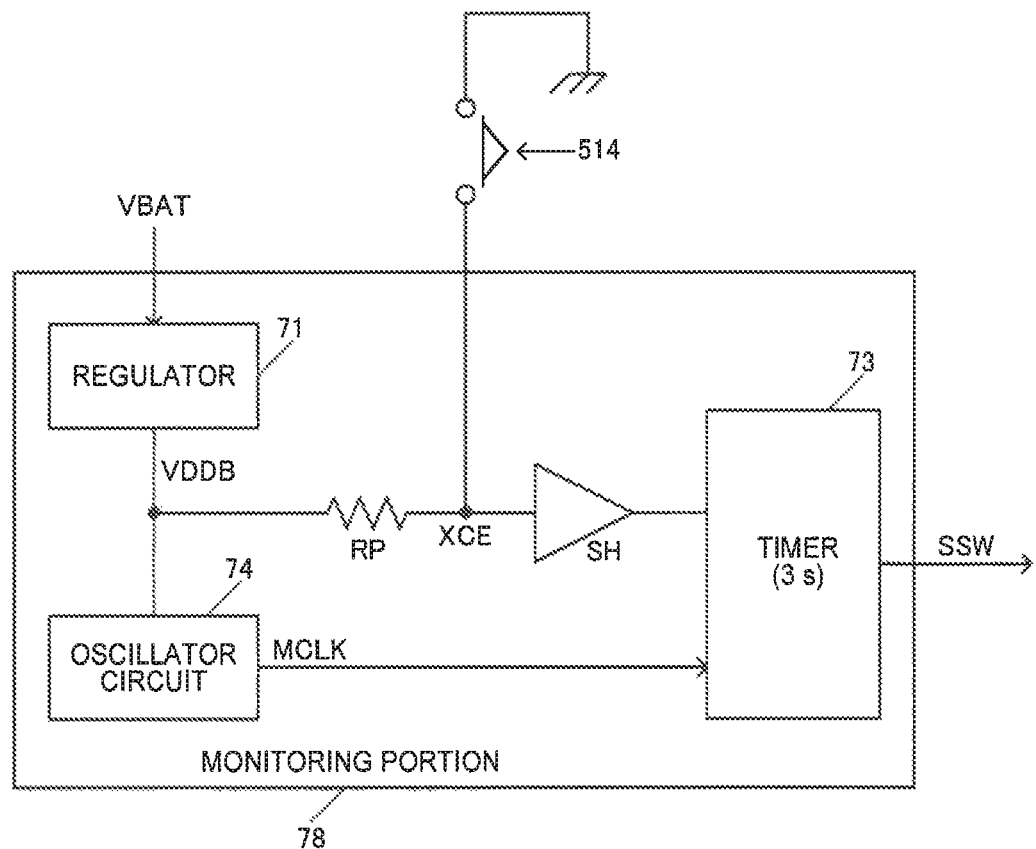
FIG. 3 is an exemplary configuration of a monitoring portion.

For example, an exemplary configuration of the monitoring portion 78 is shown in FIG. 3. The monitoring portion 78 is a circuit that monitors a long pressing operation (3 sec, for example) of the switch portion 514 and outputs a detection signal SSW.

The monitoring portion 78 includes a regulator 71, a timer 73, an oscillator circuit 74, a pull-up resistor RP, and a schmitt trigger SH. The regulator 71 regulates the battery voltage VBAT (4.2V, for example), and generates and output a power supply voltage VDDB (1.3 V, for example) that results from stepping down the battery voltage VBAT. The oscillator circuit 74 is supplied with the power supply voltage VDDB from the regulator 71, performs an oscillation operation, and generates and outputs a clock signal MCLK. The oscillator circuit 74 is a circuit that can oscillate even at a low power supply voltage, and can be realized by a ring oscillator or the like.

The resistor RP in the monitoring portion 78 is provided between a node of the power supply voltage VDDB and one end of the switch portion 514. The switch portion 514 is provided as a component external to the control device 50, for example, and the one end thereof is connected to the resistor RP and the other end is connected to a ground node (node of a power supply voltage on a low potential side, in a broad sense). The switch portion 514 is a so-called push switch (button). The voltage level of a signal XCE that is output to the one end of the switch portion 514 is set to a low level, which is a ground potential, while the switch portion 514 (button) is pressed down. On the other hand, when the switch portion 514 is not pressed down, the voltage level of the signal XCE is set to a high level by being pulled up to the power supply voltage VDDB with the resistor RP.

The signal XCE is input to the timer 73 via a schmitt trigger SH for noise removal. The timer 73 is a circuit that measures the length of a period in which the signal XCE is at a low level. The timer 73 measures the period by counting the clock signal MCLK from the oscillator circuit 74. When the length of the period becomes 3 s or more, for example, the timer 73 sets the detection signal SSW to a high level (active). For example, the signal XCE becomes a low level as a result of the switch portion 514 being pressed down, and when the period in which the signal XCE is at a low level becomes 3 s or more, the detection signal SSW becomes a high level. Accordingly, whether or not a long pressing operation in which the switch portion 514 is pressed down for 3 s or more has been performed can be determined.

As a result of determining whether or not the long pressing operation of the switch portion 514 has been performed in this way, a pressing-down operation for a short period and the long pressing operation are determined to be different operation states. Accordingly, the number of types of usable operations can be increased even with a simple configuration of the switch portion 514. Also, the detection signal SSW does not become a high level through a pressing-down operation for a short period, and thus an erroneous operation can be prevented.

Figure 4A:
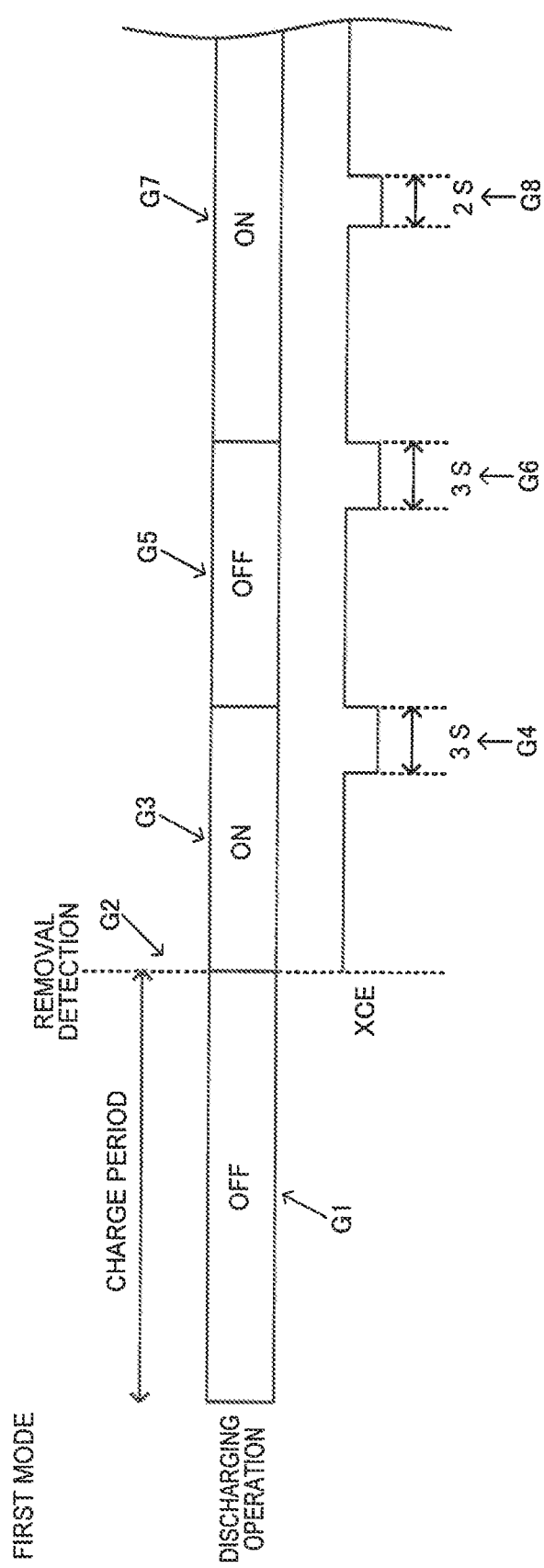
FIG. 4A is a signal waveform diagram for describing an operation of the present embodiment.
Figure 4B:
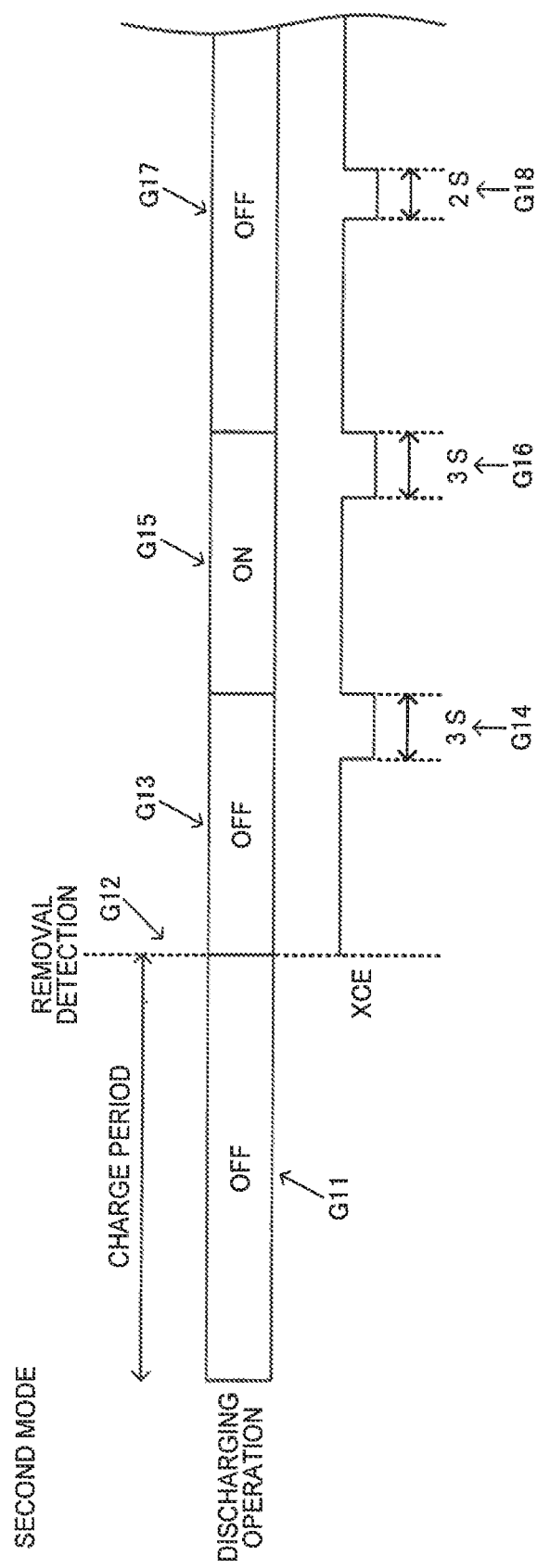
FIG. 4B is a signal waveform diagram for describing the operation of the present embodiment.

FIGS. 4A and 4B are signal waveform diagrams for describing operations of the present embodiment. FIG. 4A is a signal waveform diagram when the operation mode is set to the first mode.

As shown in G1 in FIG. 4A, the discharging operation is off in the charge period. That is, as described in FIG. 2C, as a result of the discharging operation of the discharging portion 60 being turned off while the battery 90 is charged by the charging portion 58, the discharging path is electrically cut off, and power from the battery 90 is not supplied to the power supply target 100.

When removal of the power receiving device 40 is detected during charging or after the charging has ended, as shown in G2 in FIG. 4A, the discharging operation is turned on in the first mode as shown in G3. That is, the discharging operation that was off during the charge period as shown in G1 switches from off to on when removal is detected, and the discharging operation is started. Accordingly, power from the battery 90 is supplied to the power supply target 100, and normal operation of the power supply target 100 becomes possible.

When the period in which the signal XCE is at a low level becomes 3 s or more, as shown in G4, due to an operation of long pressing the switch portion 514 for 3 s or more in a state in which the discharging operation is on, the detection signal SSW from the timer 73 in FIG. 3 becomes a high level. Then, as shown in G5 in FIG. 4A, the discharging operation of the discharging portion 60 is switched from on to off by the control portion 54 (discharging system control portion 54D). Similarly, when an operation of long pressing the switch portion 514 for 3 s or more is performed in a state in which the discharging operation is off as shown in G6, the discharging operation is switched from off to on as shown in G7. Note that the pressing-down operation shown by G8 is a pressing-down operation for a short period of time (2 s, for example) that is less than 3 s, and thus switching of the discharging operation from on to off is not performed.

FIG. 4B is a signal waveform diagram in the case where the operation mode is set to the second mode. As shown in G11 in FIG. 4B, the discharging operation is off during the charge period. When removal of the power receiving device 40 is detected during charging or after the charging has ended, as shown in G12, the discharging operation stays off in the second mode as shown in G13. That is, although the discharging operation is switched from off to on in the first mode as shown in G3 in FIG. 4A, in the second mode, the discharging operation stays off as shown in G13 even if removal is detected. Thereafter, when a long pressing operation of the switch portion 514 is performed as shown in G14, the discharging operation is switched from off to on as shown in G15. When a long pressing operation is performed next as shown in G16, the discharging operation is switched from on to off as shown in G17. Also, switching of the discharging operation is not performed by a pressing-down operation that is less than 3 s as shown in G18.

Note that the switching method of the discharging operation between on and off by the switch portion 514 is not limited to the method described in FIGS. 3 to 4B, and various modifications can be implemented. For example, a so-called level switch may be used as the switch portion 514. That is, the switch portion 514 may be a switch that outputs the signal XCE at a low level when the switch portion 514 is in a first operation state, and outputs the signal XCE at a high level when the switch portion 514 is in a second operation state. In this case, the timer 73 and the like is not needed, switching of the discharging operation between on and off is performed based on the signal XCE. For example, when the switch portion 514 is in the first operation state and the signal XCE at a low level (first voltage level) is output, the discharging operation is turned on. On the other hand, when the switch portion 514 is in the second operation state and the signal XCE at a high level (second voltage level) is output, the discharging operation is turned off.

Also, in the present embodiment, the operation mode of the discharging operation is set by the power transmitting device 10 or the external device 550. Also, communication is performed in which notification information for notifying which of the first and second modes the operation mode is set to is transmitted to the power transmitting device 10 or the external device 550.

Figure 5:
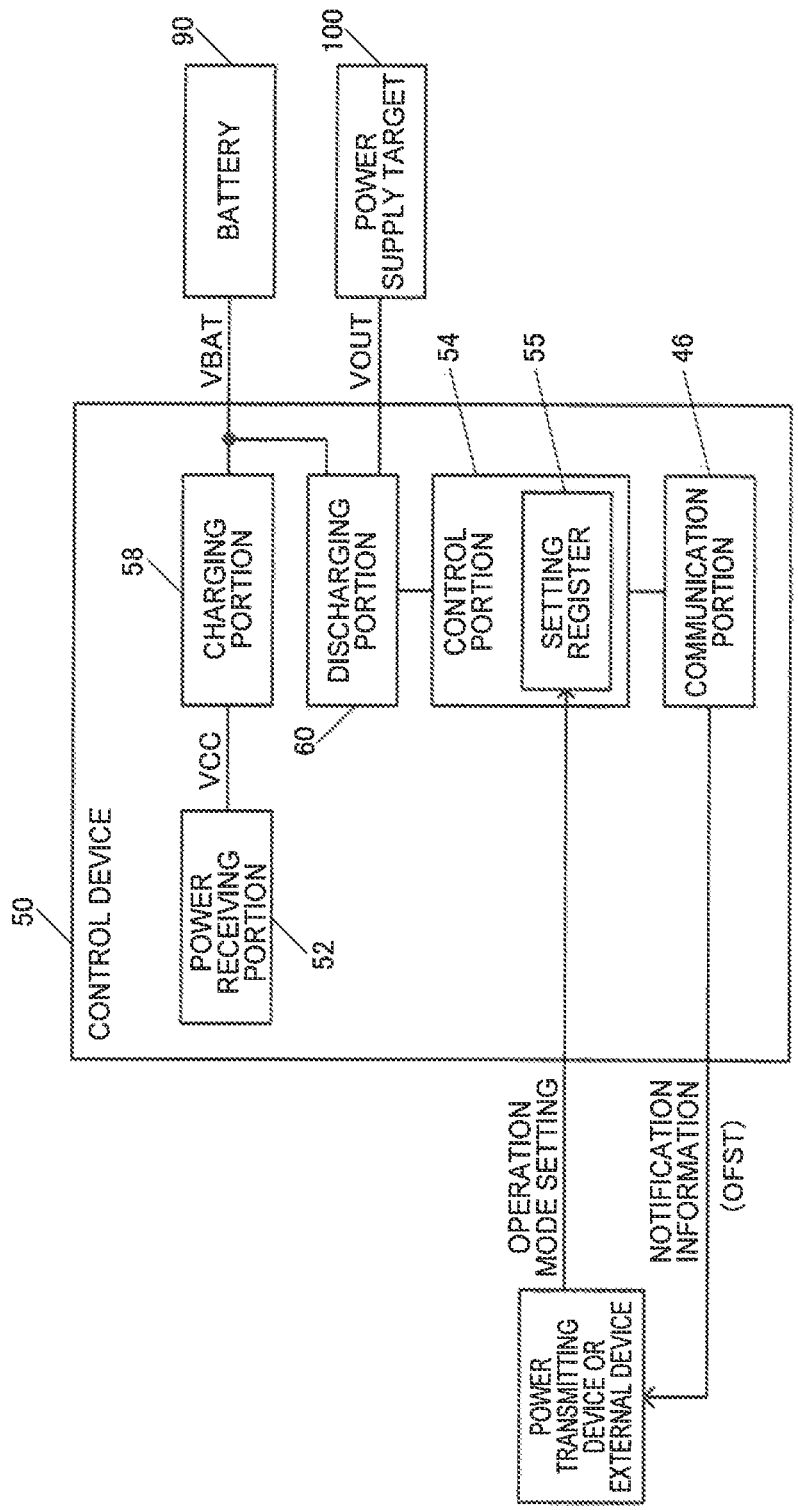
FIG. 5 is a diagram for describing a method of communicating with a power transmitting device or an external device.

For example, the power transmitting device 10 or the external device 550 sets the operation mode of the discharging operation to the setting register 55 of the control portion 54, as shown in FIG. 5. For example, in the case where an operation in the second mode is desired, the second mode is set to the setting register 55. Accordingly, the control device 50 operates in the second mode. The discharging operation is turned off when removal is detected, and off-start of the discharging operation is realized, as shown in FIGS. 2B and 4B. On the other hand, in the case where the first mode is set to the setting register 55, the control device 50 operates in the first mode. The discharging operation is turned on when removal is detected, and thus the normal operation is realized, as shown in FIGS. 2A and 4A.

Also, the power transmitting device 10 or the external device 550 is notified which of the operation modes the control device 50 is set to by the communication portion 46 transmitting notification information. For example, in FIG. 5, the communication portion 46 transmits a flag OFST to the power transmitting device 10 or the external device 550 as the notification information. For example, when the operation mode is set to the first mode, OFST=0 is transmitted as the notification information, and when the operation mode is set to the second mode, OFST=1 is transmitted as the notification information. In this way, the power transmitting device 10 or the external device 550 can recognize which of the first and second modes the operation mode has been set.

For example, the power transmitting device 10 or the external device 550 sets the operation mode to the setting register 55 by transmitting (responding) communication data to the control device 50, or the like. For example, the second mode is set to the setting register 55 when a product (electronic apparatus, control device) is manufactured or shipped.

However, it is necessary for the manufacturer to confirm that the operation mode is certainly set to the second mode when the produce is manufactured or shipped. Therefore, in FIG. 5, the control device 50 (communication portion) transmits the flag OFST to the power transmitting device 10 or the external device 550 (such as a personal computer on the manufacturing site) as the notification information. In this way, as a result of confirming that the flag OFST=1 is set, the fact that the operation mode is certainly set to the second mode can be confirmed. For example, in the case of flag OFST=1, an LED or the like, which is the reporting portion provided in the charger, is lighted, and thus a worker at the manufacturing site can confirm that the operation mode is set to the second mode.

For example, when a product is manufactured and shipped, a charger dedicated to the period of manufacturing and shipment is prepared and charging is performed by using the dedicated charger. In the case where the dedicated charger is used, the operation mode is automatically set to the second mode by the power transmitting device 10 included in the dedicated charger. In this way, when the product is manufactured and shipped, the second mode is automatically set, discharging operation is set to off in the storage period of the product, and thus a situation in which power is wastefully consumed in the storage period can be prevented.

On the other hand, in the case where charging is performed by a charger owned by a user, the power transmitting device 10 included in the charger owned by the user automatically sets the operation mode to the first mode. In this way, in a use environment of the user (in the normal operation), the discharging operation is set to be turned on when the electronic apparatus is removed from the charger. Accordingly, upon detecting removal, the discharging operation is automatically turned on, and thus power from the battery 90 can be supplied to the power supply target 100.

In this case, a method is conceivable in which, as a method of the comparative example, the discharging operation is set to be turned off using the switch portion 514 described in FIGS. 3 to 4B when a product is manufactured and shipped. For example, in the case where the discharging operation is turned on when removal is detected, as shown in G2 and G3 in FIG. 4A, the discharging operation is turned off, as shown in G5, by performing a long pressing operation on the switch portion 514, as shown in G4.

However, in the method of the comparative example, a worker at the manufacturing site needs to operate the switch portion 514, and thus the manufacturing process is complicated and the cost of the product increases. Also, when the worker who turns off the discharging operation makes an operational error, the discharging operation is erroneously set to be turned on when removal is detected, and lacks in reliability.

In this regard, according to the method of the present embodiment, the second mode (off-start mode) in which the discharging operation is turned off when removal is detected, as shown in FIG. 4B, is provided, in addition to the first mode (normal operation mode) in which the discharging operation is turned on when removal is detected, as shown in FIG. 4A. Accordingly, if the operation mode is set to the second mode using a dedicated charger, the discharging operation is automatically set to be turned off at the time of removal after charging. Therefore, a work step of the worker using the switch portion 514 or the like can be omitted, and thus simplification of the manufacturing process and reduction in cost of the product can be realized. Also, a situation in which the discharging operation is erroneously set to be turned on when removal is detected due to an operational error of the worker or the like can be prevented, and the discharging operation in the storage period after shipment of the product can be reliably turned off.

Figure 6:
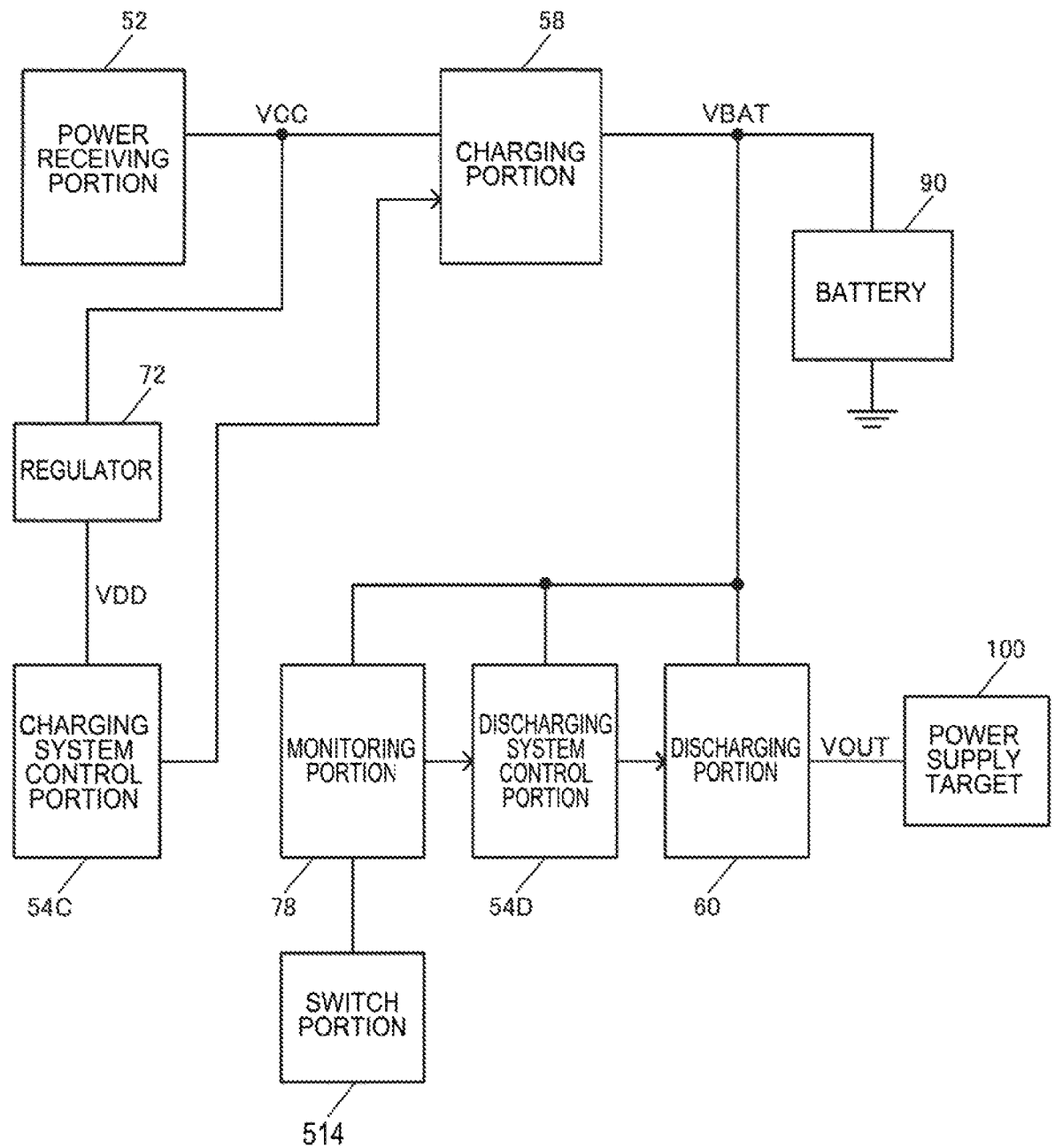
FIG. 6 is an exemplary configuration of a receiving side control device.

FIG. 6 is a diagram illustrating an exemplary configuration of the receiving side control device 50. As shown in FIG. 6, the charging system control portion 54C and the discharging system control portion 54D are provided in the control device 50 as the control portion 54. The charging system control portion 54C is supplied with a power supply voltage based on the output voltage VCC (rectification voltage) of the power receiving portion 52 so as to operate. For example, the regulator 72 regulates (steps down) the output voltage VCC so as to generate the power supply voltage of VDD=1.8V, for example, and the power supply voltage is supplied to the charging system control portion 54C. The charging system control portion 54C operates with the supplied power supply voltage VDD, and controls the charging portion 58 and the like.

On the other hand, the discharging system control portion 54D is supplied with a power supply voltage that is based on the battery voltage VBAT (VBAT itself or a power supply voltage generated based on VBAT) so as to operate.

That is, in a period in which the electronic apparatus is placed on the charger and the power receiving portion 52 receives power, the charging system control portion 54C operates with the power supply voltage VDD that is based on the output voltage VCC of the power receiving portion 52 being supplied, and controls the charging portion 58 and the like.

Also, when the electronic apparatus is removed from the charger and the power receiving portion 52 enters a state of not receiving power, the output voltage VCC of the power receiving portion 52 decreases, and charging system circuits such as the charging system control portion 54C enter a reset state, for example. On the other hand, discharging system circuits such as the discharging system control portion 54D, the discharging portion 60, and the monitoring portion 78 are supplied with the battery voltage VBAT and enter an operable state. Accordingly, an operation can be realized in which power from the battery 90 is supplied to the power supply target 100 by turning on the discharging operation of the discharging portion 60 after the electronic apparatus 510 is removed.

3. Contactless Power Transmission System

Next, an application example in which the method of the present embodiment is applied to a contactless power transmission system will be described. In this case, the power receiving device 40 contactlessly (wirelessly) receives power from the power transmitting device 10. Specifically, the charging portion 58 charges the battery 90 based on power contactlessly received from the power transmitting device 10.

Figure 7A:
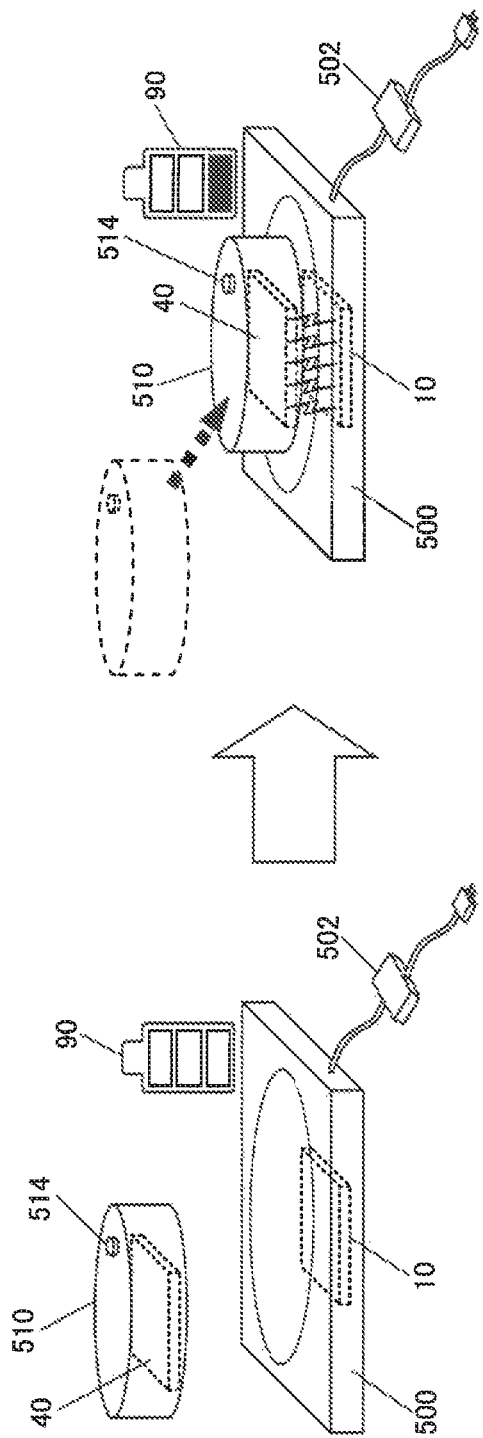
FIG. 7A is a diagram for describing a contactless power transmission system.

An example of a contactless power transmission system of the present embodiment is shown in FIG. 7A. A charger 500 (one of electronic apparatuses) includes the power transmitting device 10. The electronic apparatus 510 includes the power receiving device 40. Also, the electronic apparatus 510 includes the operation switch portion 514 (an operation portion, in a broad sense) and the battery 90. Note that, although the battery 90 is schematically illustrated in FIG. 7A, the battery 90 is, in actuality, incorporated in the electronic apparatus 510. The contactless power transmission system of the present embodiment is constituted by the power transmitting device 10 and the power receiving device 40 in FIG. 7A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus for measuring a pulse wave or the like), a mobile information terminal (such as a smartphone or a cellular phone), a cordless telephone, a shaver, an electric toothbrush, a wrist computer, a handy terminal, an onboard apparatus, a hybrid car, an electric car, an electric motorcycle, and an electric bicycle. For example, a control device (such as a power receiving device) of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses (onboard apparatuses), and travel on the ground, through the air, and on the sea, for example.

Figure 7B:
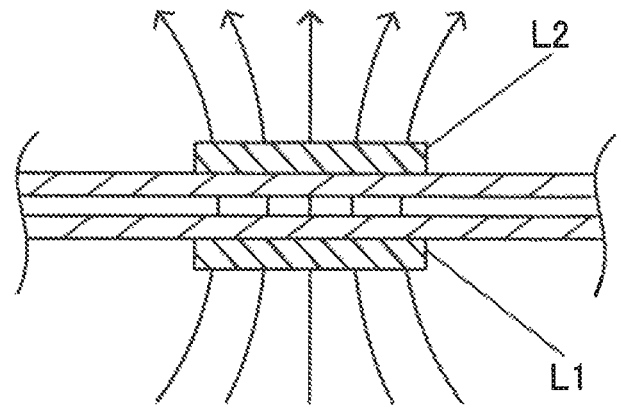
FIG. 7B is a diagram for describing a relationship between a primary coil and a secondary coil.

As schematically shown in FIG. 7B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible. Note that various methods such as an electromagnetic induction method and a magnetic field resonance method can be adopted as the contactless power transmission method.

Figure 8:
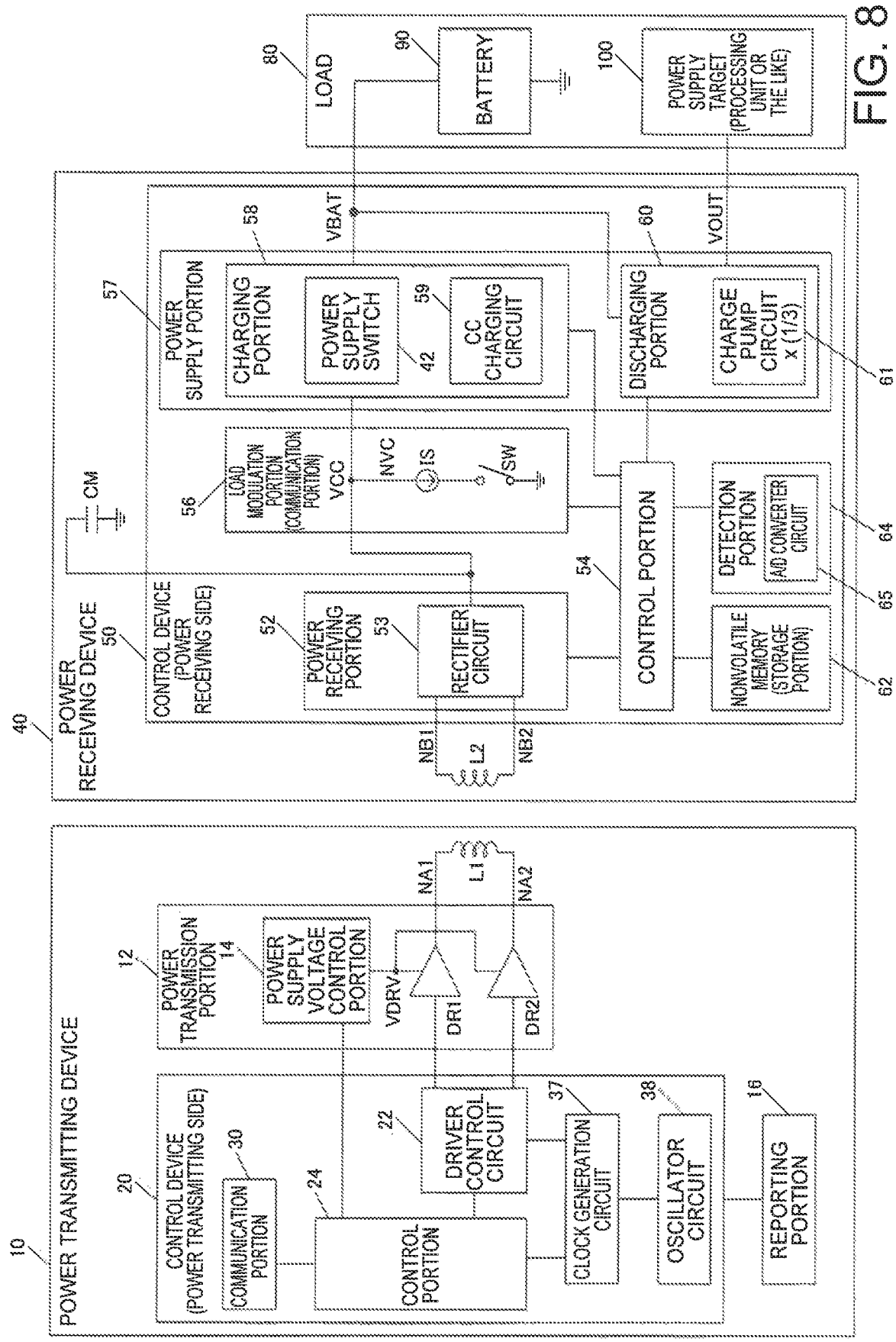
FIG. 8 is a detailed exemplary configuration of the control device, the power transmitting device, and the power receiving device of the present embodiment.

4. Detailed Exemplary Configuration of Power Transmitting Device, Power Receiving Device, and Control Device A detailed exemplary configuration of the control devices 20 and 50 of the present embodiment and the power transmitting device 10 and the power receiving device 40 that respectively include the control devices 20 and 50 is shown in FIG. 8. Note that detailed description of configurations in FIG. 8 similar to those in FIG. 1 will be omitted.

The electronic apparatus on the power transmitting side such as the charger 500 in FIG. 7A includes the power transmitting device 10. Also, the electronic apparatus 510 on the power receiving side includes the power receiving device 40 and a load 80. According to the configuration in FIG. 8, a contactless power transmission (wireless power transfer) system is realized in which power is transmitted from the power transmitting device 10 to the power receiving device 40 by electromagnetically coupling the primary coil L1 and the secondary coil L2.

The power transmitting device 10 includes the primary coil L1, the power transmission portion 12, a reporting portion 16, and the control device 20. The power transmission portion 12, when power is transmitted, generates an AC voltage having a predetermined frequency, and supplies the AC voltage to the primary coil L1. The power transmission portion 12 includes a first power transmission driver DR1 that drives one end of the primary coil L1, a second power transmission driver DR2 that drives the other end of the primary coil L1, and a power supply voltage control portion 14. The power transmission drivers DR1 and DR2 are each realized by an inverter circuit (buffer circuit) that is constituted by a power MOS transistor, for example, or the like. The power transmission drivers DR1 and DR2 are controlled (driven) by a driver control circuit 22 of the control device 20. That is, the control portion 24 controls the power transmission portion 12 via the driver control circuit 22.

The power supply voltage control portion 14 controls a power supply voltage VDRV of the power transmission drivers DR1 and DR2. For example, the control portion 24 controls the power supply voltage control portion 14 based on communication data (transmitting power setting information) received from the power receiving side. Accordingly, the power supply voltage VDRV supplied to the power transmission drivers DR1 and DR2 is controlled, and variable control of the transmitting power or the like can be realized, for example. The power supply voltage control portion 14 can be realized by a DC/DC converter or the like, for example. For example, the power supply voltage control portion 14 performs a step-up operation on the power supply voltage (5 V, for example) from the power supply so as to generate the power supply voltage VDRV (6 V to 15 V, for example) for the power transmission drivers, and supplies the power supply voltage VDRV to the power transmission drivers DR1 and DR2. Specifically, when the transmitting power from the power transmitting device 10 to the power receiving device 40 is increased, the power supply voltage control portion 14 increases the power supply voltage VDRV that is supplied to the power transmission drivers DR1 and DR2, and when the transmitting power decreases, the power supply voltage control portion 14 decreases the power supply voltage VDRV.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 7A and 7B. On the other hand, when power transmission is not needed, the electronic apparatus 510 is physically separated from the charger 500 so as to be in a state in which the magnetic flux of the primary coil L1 does not pass through the secondary coil L2.

The reporting portion 16 (display portion) reports (displays) various states (such as being in power transmission and ID authentication) of the contactless power transmission system using light, sound, or an image, and is realized by an LED, a buzzer, or an LCD, for example.

The power transmitting side control device 20 includes the driver control circuit 22, the control portion 24, the communication portion 30, a clock generation circuit 37, and an oscillator circuit 38. The driver control circuit 22 (pre-driver) controls the power transmission drivers DR1 and DR2. For example, the driver control circuit 22 outputs a control signal (drive signal) to the gates of transistors that constitute the power transmission drivers DR1 and DR2, and causes the power transmission drivers DR1 and DR2 to drive the primary coil L1. The oscillator circuit 38 is constituted by a crystal-oscillator circuit or the like, and generates a clock signal for the primary side. The clock generation circuit 37 generates a drive clock signal that defines a power transmission frequency (drive frequency), or the like. Also, the driver control circuit 22 generates a control signal having a given frequency (power transmission frequency), based on the drive clock signal and the control signal from the control portion 24, and outputs the control signal to the power transmission drivers DR1 and DR2 in the power transmission portion 12 for control.

The power receiving device 40 includes the secondary coil L2 and the control device 50. The control device 50 on the power receiving side includes the power receiving portion 52, the control portion 54, a load modulation portion 56, the power supply portion 57, a nonvolatile memory 62, and a detection portion 64.

The power receiving portion 52 includes a rectifier circuit 53 constituted by a plurality of transistors and diodes. The rectifier circuit 53 converts an AC induced voltage in the secondary coil L2 to the DC rectified voltage VCC, and outputs the rectified voltage VCC.

The load modulation portion 56 (communication portion, in a broad sense) performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control portion 54, for example, and a current (constant current) of the current source IS that flows from the node NVC to GND is caused to flow or be cut off, and thus the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 8, and various modifications such as using a resistor in place of the current source IS can be implemented.

The power supply portion 57 includes the charging portion 58 and the discharging portion 60. The charging portion 58 performs charging of the battery 90 (charging control). For example, the charging portion 58 is supplied with a voltage that is based on the rectified voltage VCC (DC voltage, in a broad sense) from the power receiving portion 52, and charges the battery 90. The charging portion 58 can include a power supply switch 42 and a CC charging circuit 59. The CC charging circuit 59 is a circuit that performs CC (Constant-Current) charging of the battery 90.

The discharging portion 60 performs a discharging operation for discharging the battery 90. For example, the discharging portion 60 performs the discharging operation for discharging the battery 90, and supplies power from the battery 90 to the power supply target 100. For example, the discharging portion 60 is supplied with the battery voltage VBAT from the battery 90, and supplies the output voltage VOUT to the power supply target 100. The discharging portion 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging portion 60 (charge pump circuit) operates with the battery voltage VBAT, for example, as the power supply voltage.

The nonvolatile memory 62 (storage portion, in a broad sense) is a nonvolatile memory device that stores various types of information. The nonvolatile memory 62 stores various types of information such as status information of the power receiving device 40, for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the battery voltage VBAT, and the like. Specifically, the detection portion 64 includes an A/D converter circuit 65, performs A/D conversion on voltages based on the rectified voltage VCC and the battery voltage VBAT, a temperature detection voltage from an unshown temperature detection portion, and the like by using the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64.

In FIG. 8, when landing of the power receiving device 40 is detected, the control portion 54 (discharging system control portion) turns off the discharging operation of the discharging portion 60 and stops the discharging operation. That is, in FIG. 7A, when landing of the power receiving device 40 (electronic apparatus on the power receiving side) is detected, the control portion 54 stops the discharging operation of the discharging portion 60 (supply of VOUT) so that power from the battery 90 is not discharged to the power supply target 100. In the normal power transmission period in which the power transmitting device 10 performs the normal power transmission, the control portion 54 turns off the discharging operation of the discharging portion 60. For example, during a period in which the battery 90 is being charged, the discharging operation of the discharging portion 60 is kept off.

In the case where the operation mode is set to the first mode, when removal of the power receiving device 40 is detected, the control portion 54 turns off the discharging operation of the discharging portion 60. The discharging portion 60 is caused to perform a discharging operation in a removed period (in a period in which the power receiving device is removed). As a result of the discharging operation, power from the battery 90 is supplied to the power supply target 100 via the discharging portion 60.

Also, when landing of the power receiving device 40 (electronic apparatus on the power receiving side) is detected, the load modulation portion 56 starts load modulation. The power transmitting device 10 (control portion 24) starts normal power transmission using the power transmission portion 12 on the condition that the power receiving device 40 (load modulation portion 56) has started load modulation. Also, when removal of the power receiving device 40 is detected, the load modulation portion 56 stops the load modulation. The power transmitting device 10 (control portion 24) continues the normal power transmission by the power transmission portion 12 while the load modulation continues. That is, when the load modulation is no longer detected, the normal power transmission is caused to stop, and the power transmission portion 12 is caused to perform intermittent power transmission for landing detection, for example. In this case, the control portion 54 on the power receiving side can perform the landing detection and the removal detection based on the output voltage VCC of the power receiving portion 52.

Also, in the case where the operation mode is set to the first mode, the control portion 54 (discharging system control portion) turns on the discharging operation of the discharging portion 60 so as to start the discharging operation after a start-up period (TST) of the discharging operation has elapsed, the start-up period being initiated by the reduction of the output voltage (VCC, VD5) of the power receiving portion 52. Specifically, after the start-up period has elapsed from when the output voltage of the power receiving portion 52 decreased below a judgement voltage, the control portion 54 starts the discharging operation of the discharging portion 60. The start-up period (TST) is a period from a start timing (later-described C4 in FIG. 11) of the start-up operation of the discharging operation until a timing (C8 in FIG. 11) at which the discharging operation actually starts, for example, and corresponds to a waiting period until the start timing of the discharging operation.

Also, the power transmitting device 10 performs intermittent power transmission for removal detection. For example, in the case where full charge of the battery 90 is detected or in the case where an abnormality is detected on the power receiving side, power transmitting device 10 stops normal power transmission, and performs intermittent power transmission for removal detection. Also, the start-up period of the discharging operation of the discharging portion 60 is a period that is longer than the interval between the periods of the intermittent power transmission for removal detection.

Also, when the power transmitting device 10 has succeeded in detecting landing (detection of the dummy data, for example) and has replied to the power receiving device 40, the control portion 54 sets the operation mode to the second mode based on the response.

The power transmitting device 10 makes the above-mentioned reply by changing the power transmission frequency, for example. Assume that the power transmission has been made with a first power transmission frequency (f1) in a normal state, for example. The power transmitting device 10 changes the power transmission frequency from the first power transmission frequency to a second power transmission frequency (f2) in a given reply period after detecting landing (after having received the dummy data). The control portion 54 on the power receiving side detects the reply from the power transmitting device 10 by measuring the power transmission frequency (power reception frequency corresponding to the power transmission frequency) and detecting the change in the power transmission frequency in a measurement period corresponding to the reply period. In the case where it has been detected that the power transmission frequency has changed from the first power transmission frequency (f1) to the second power transmission frequency (f2) in the measurement period, the control portion 54 determines that the power transmitting device 10 has replied. The control portion 54 sets the operation mode to the second mode on the condition of receiving such a reply.

Also, the load modulation portion 56 transmits notification information for notifying the power transmitting device 10 which of the first and second modes the operation mode is set to, as communication data. It is sufficient that the notification information is information with which the power transmitting side can at least recognize that the operation mode is set to the second mode.

5. Operation Sequence of Contactless Power Transmission System

Figure 9:
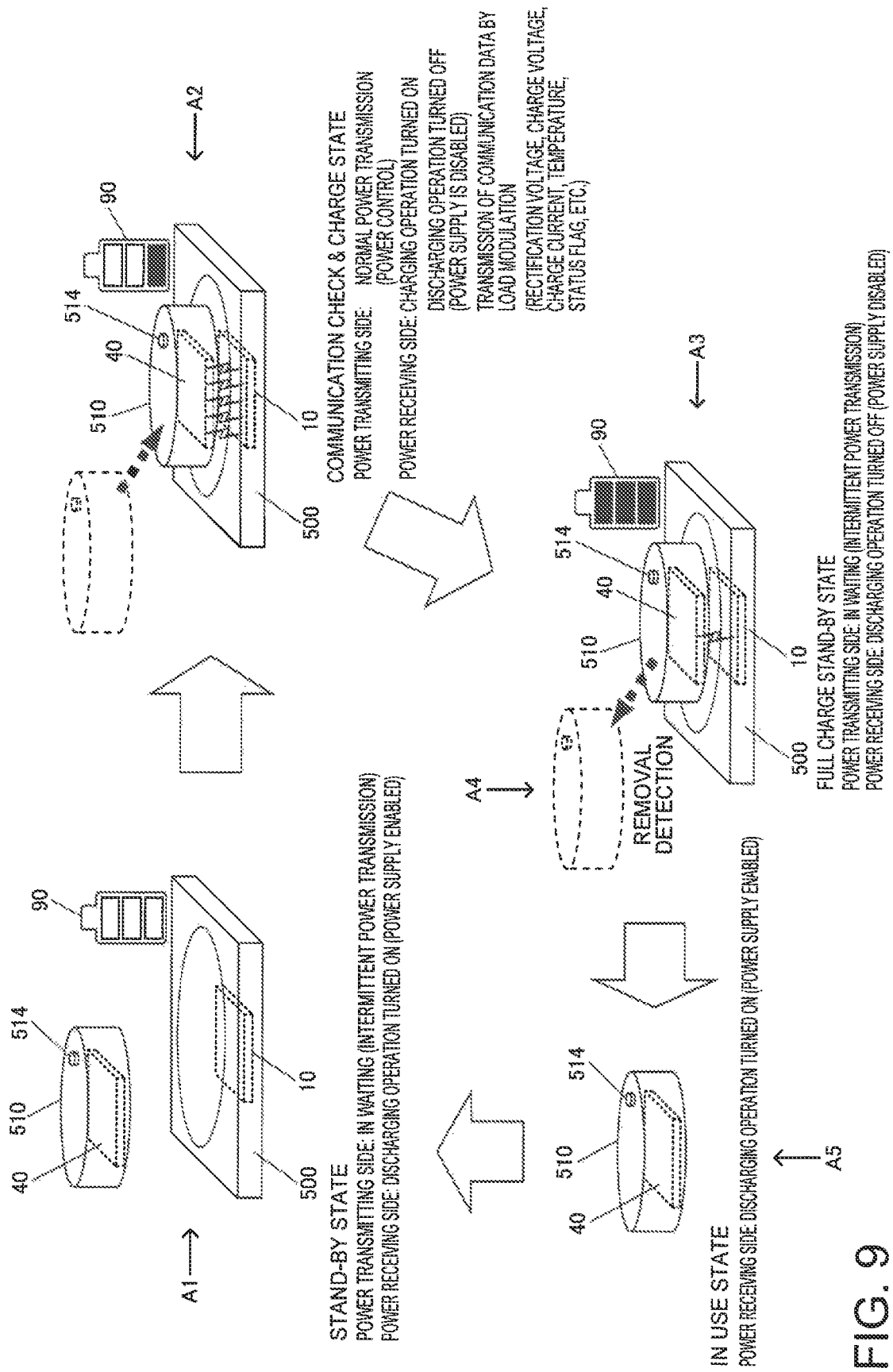
FIG. 9 is a diagram for describing an example of an operation sequence of the contactless power transmission system.

Next, an example of an operation sequence of the contactless power transmission system of the present embodiment will be described. FIG. 9 is a diagram for describing an outline of an operation sequence.

In A1 in FIG. 9, the electronic apparatus 510 including the power receiving device 40 is not placed on the charger 500 including the power transmitting device 10, and is in a removed state. In this case, a stand-by state is realized. In the stand-by state, the power transmission portion 12 in the power transmitting device 10 is in a state in which landing of the electronic apparatus 510 is detected by performing intermittent power transmission for landing detection. Also, in the stand-by state, the discharging operation to the power supply target 100 is turned on in the power receiving device 40, and the power supply to the power supply target 100 is enabled. Accordingly, the power supply target 100 such as a processing unit is supplied with the power from the battery 90, and can operate.

As shown in A2 in FIG. 9, when the electronic apparatus 510 is placed on the charger 500, and landing is detected, a communication check & charge state is realized. In the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC, which is the output voltage from the power receiving portion 52. The charge state of the battery 90 can be determined based on the information such as the battery voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including power transmission status information (such as VCC), charge status information (such as VBAT and various status flags), and information such as a temperature is transmitted from the power receiving side to the power transmitting side by regular load modulation in a normal power transmission period.

As shown in A3 in FIG. 9, when full charge of the battery 90 is detected, a full charge stand-by state is realized. In the full charge stand-by state, the power transmission portion 12 is in a state in which intermittent power transmission for removal detection is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 9, the electronic apparatus 510 is in a use state, and the discharging operation of the power receiving side is turned on, as shown in A5 in FIG. 9. Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates using the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 9. Also, when landing is detected, the discharging operation of the discharging portion 60 is stopped. In this regular load modulation, communication data including information for controlling power on the power transmitting side, and information representing the status on the power receiving side are transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 9. When removal is detected and the removed period begins, the discharging operation of the discharging portion 60 is performed, as shown in A4 and A5 in FIG. 9. Accordingly, power from the battery 90 is supplied to the power supply target 100, and normal operation of the electronic apparatus 510 becomes possible. Note that landing detection and removal detection are performed based on the output voltage VCC of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and normal operation of the power supply target 100 such as a processing unit (DSP) becomes possible. In this way, an operation sequence of preferable contactless power transmission can be realized in a type of electronic apparatus 510 (electronic apparatus such as a hearing aid or a wearable apparatus that is worn by a user, for example) that does not operate in the charge period during which the electronic apparatus 510 is placed on the charger 500, for example.

Figure 10:
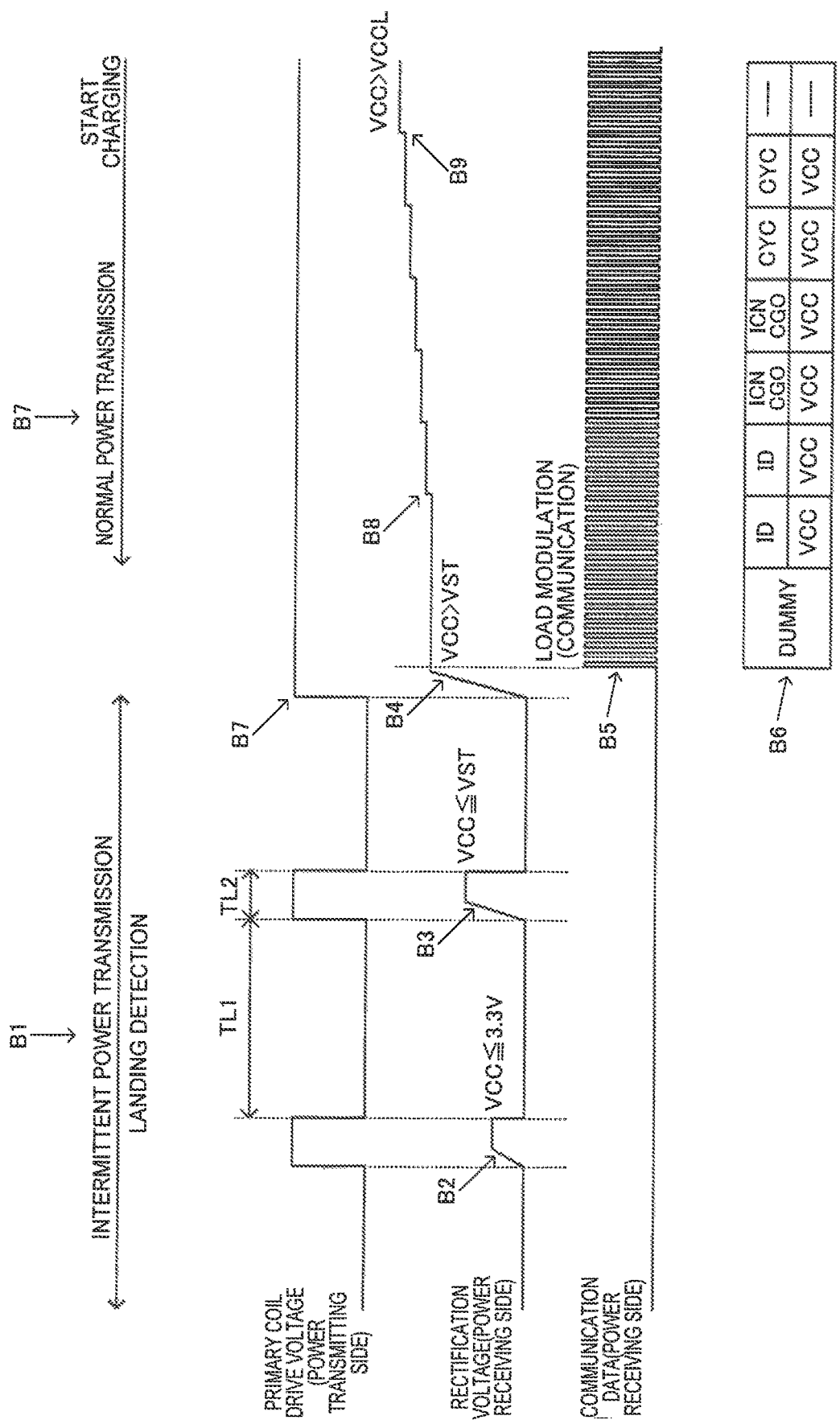
FIG. 10 is a signal waveform diagram for describing an operation sequence at the time of landing detection.
Figure 11:
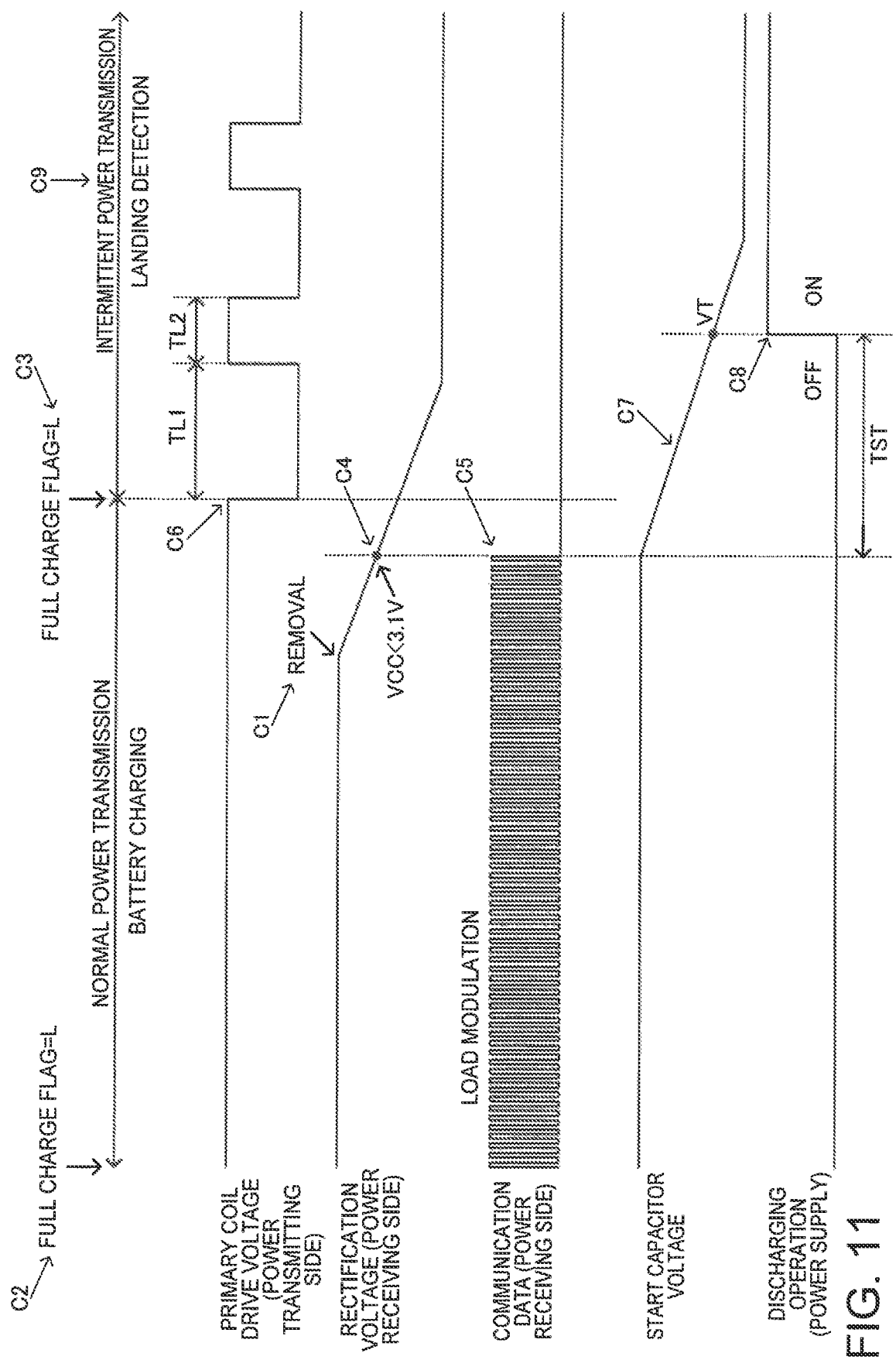
FIG. 11 is a signal waveform diagram for describing an operation sequence at the time of removal.
Figure 12:
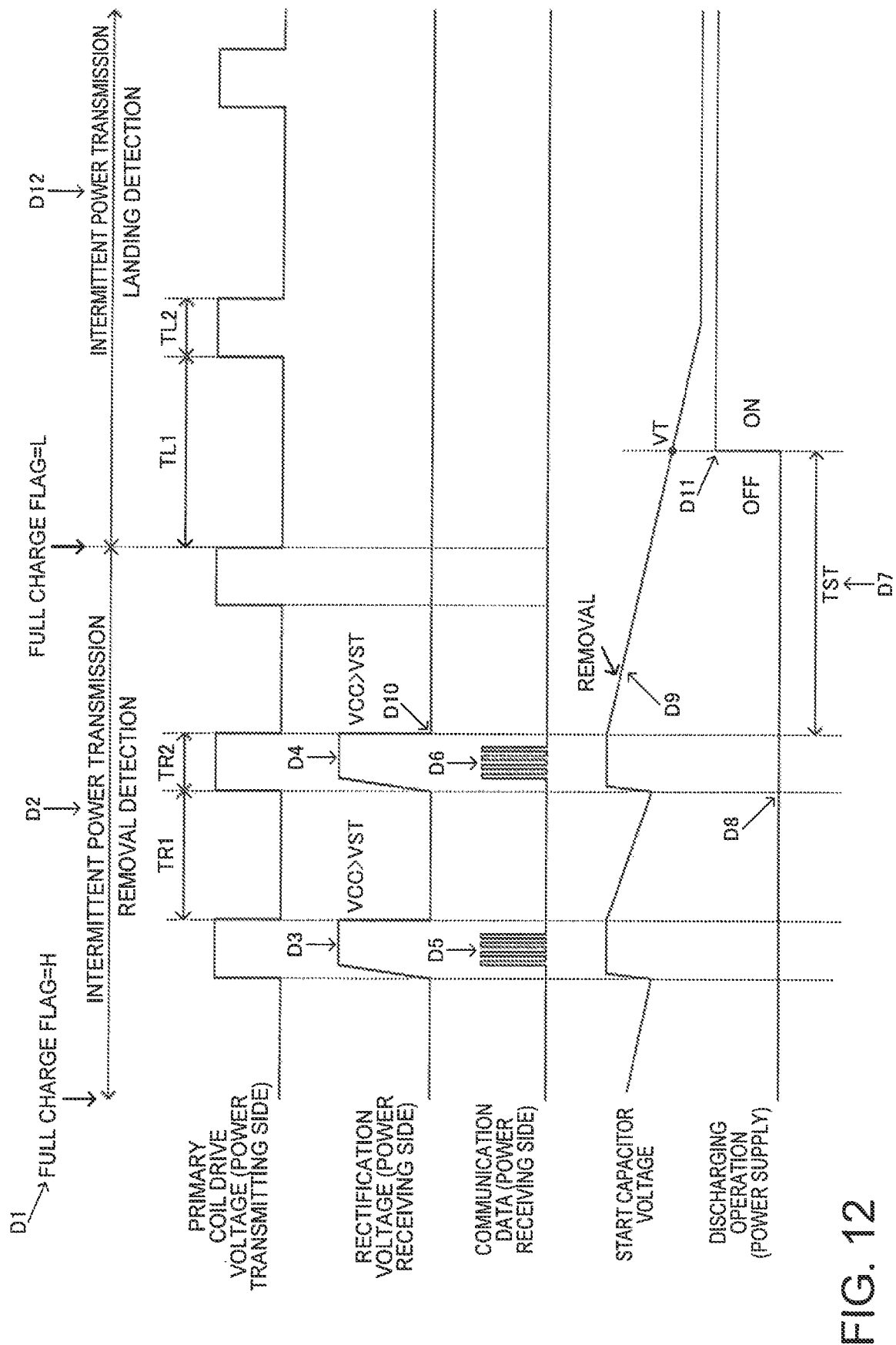
FIG. 12 is a signal waveform diagram for describing the operation sequence at the time of removal.

FIGS. 10 to 12 are signal waveform diagrams for describing a detailed operation sequence of the contactless power transmission system of the present embodiment.

B1 in FIG. 10 is the stand-by state in A1 in FIG. 9, and intermittent power transmission for landing detection is performed. That is, power transmission in a period TL2 is performed at the intervals of a period TL1. The period of TL1 is 3 s for example, and the period of TL2 is 50 ms for example. In B2 and B3 in FIG. 10, the rectified voltage VCC is less than or equal to the voltage VST (less than or equal to the first voltage), and therefore, communication by load modulation is not performed.

On the other hand, in B4, the rectified voltage VCC exceeds the voltage VST (4.5 V, for example), and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 7B. Accordingly, the rectified voltage VCC increases and exceeds the voltage VST, and load modulation is started, as shown in B5. Then, communication data as shown in B6 is transmitted to the power transmitting side by this load modulation. The start of the load modulation in B5 is triggered by the increase in the rectified voltage VCC due to the intermittent power transmission for landing detection shown in B7.

Specifically, the power receiving side transmits dummy data (64 bits of "0", for example) for landing detection. The power transmitting side detects landing of the power receiving side by detecting this dummy data (detecting 8 bits of "0", for example), and starts normal power transmission (continuous power transmission) as shown in B7.

Next, the power receiving side transmits information such as ID information or rectified voltage VCC. As described above, simplified authentication processing can be realized as a result of the power transmitting side making a reply with respect to the transmission of the ID information.

Also, the power transmitting side controls the transmitting power by receiving the transmitting power setting information, which is information of the rectified voltage VCC. As a result of the power transmitting side controlling the transmitting power, the rectified voltage VCC increases as shown in B8. Then, when the VCC exceeds the voltage VCCL (second voltage), as shown in B9, charging of the battery 90 is started.

In the present embodiment in this way, the voltage VST at which the load modulation (communication) is started can be set low. Accordingly, the occurrence of a failure such as a breakdown voltage abnormality caused by the drive voltage of the power transmitting side being set high can be suppressed. The transmitting power of the power transmitting side is controlled by transmitting the transmitting power setting information (VCC) to the power transmitting side by the started load modulation, and as a result of controlling the transmitting power, the rectified voltage VCC increases, as shown in B8. Then, when the rectified voltage VCC increases and exceeds the voltage VCCL, which is a chargeable voltage, as shown in B9, charging of the battery 90 is started. Accordingly, both of the landing detection over a large distance range and suppression of the occurrence of failure such as a breakdown voltage abnormality can be realized.

In C1 in FIG. 11, the electronic apparatus 510 is removed in a normal power transmission period during which charging of the battery 90 is performed. The removal in C1 is removal before the battery 90 is fully charged (full charge flag=Low level), as shown in C2 and C3.

When the electronic apparatus 510 is removed in this way, the power on the power transmitting side is not transmitted to the power receiving side, and the rectified voltage VCC decreases. Then, when the VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC decreases below 3.1 V, for example, which is a judgement voltage, discharge of a start capacitor (CST in FIG. 13) on the power receiving side is started. The start capacitor is a capacitor for starting up the discharging operation (for measurement of a start-up period) on the power receiving side, and is provided as a component external to the power receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Also, the power transmission portion 12 starts to perform intermittent power transmission for landing detection, as shown in C9, after normal power transmission has been stopped. The start-up period TST is a period from a timing (C4) at which the start-up operation of the discharging operation is performed until a timing (C8) at which the discharging operation actually starts. That is, the start-up operation of the discharging operation is determined to be performed at the timing C4 in FIG. 11, but the discharging operation is not started immediately and the start thereof is delayed until the timing C8 at which the start-up period TST, which is a waiting period, has elapsed, and the discharging operation is started (switched from off to on).

In D1 in FIG. 12, the full charge flag is at a high level which is an active level, and the full charge of the battery 90 is detected. When the full charge is detected in this way, the intermittent power transmission for removal detection after full charge is performed, as shown in D2. That is, power transmission is performed during a period TR2 at the intervals of a period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC of the power receiving portion 52 increases above VST due to the intermittent power transmission for removal detection, as shown in D3 and D4 in FIG. 12, and the load modulation is performed as shown in D5 and D6. The fact that the electronic apparatus 510 has not been removed can be detected on the power transmitting side by detecting the load modulation (null communication data or the like).

Also, a period TR1 (1.5 s, for example) of the interval for the intermittent power transmission for removal detection is shorter than the start-up period TST (longer than 3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 starts to be performed.

In the present embodiment as described above, on the condition that the power receiving device 40 has started the load modulation, as shown in B5 in FIG. 10, normal power transmission by the power transmission portion 12 is started, as shown in B7. While the load modulation in B5 continues, the normal power transmission shown in B7 continues. Specifically, as shown in C5 in FIG. 11, in the case where load modulation is no longer detected, normal power transmission by the power transmission portion 12 is stopped as shown in C6. Then, intermittent power transmission for landing detection by the power transmission portion 12 starts to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, contactless power transmission and communication by load modulation can be realized in a simple operation sequence. Also, as a result of performing communication by regular load modulation during a normal power transmission period, effective contactless power transmission according to the state of the power transmission or the like can be realized.

6. Discharging Operation of Discharging Portion

In the present embodiment, as described in FIGS. 11 and 12, the control portion 54 (discharging system control portion) on the power receiving side starts the discharging operation of the discharging portion 60 after the start-up period TST of the discharging operation has elapsed, the start-up period being initiated by the reduction of the rectification voltage VCC (VD5) that is the output voltage of the power receiving portion 52. Then, power from the battery 90 is discharged to the power supply target 100. Specifically, the control portion 54 starts the discharging operation of the discharging portion 60 after the start-up period TST has elapsed from when the rectification voltage VCC (or later-described VD5) decreased below the judgement voltage (3.1 V). For example, the control portion 54 outputs a signal to start discharging to the discharging portion 60 so as to start discharging operation. Accordingly, as shown in C8 in FIG. 11 or D11 in FIG. 12, the discharging operation of the discharging portion 60 is turned on and power from the battery 90 is supplied to the power supply target 100.

Also, in the present embodiment, as shown in D2 and D7 in FIG. 12, the intermittent power transmission for removal detection is performed at intervals of the period TR1 (1.5 s, for example) that is shorter than the start-up period TST (5 s, for example). That is, the start-up period TST is longer than the period TR1 of an interval of the intermittent power transmission for removal detection.

In this way, the start-up period TST does not elapse during the period TR1 for removal detection, and therefore the discharging operation of the discharging portion 60 is not turned on in the period of the intermittent power transmission for removal detection. When the electronic apparatus 510 is removed as shown in D9 in FIG. 12, the rectification voltage VCC no longer regularly increase, not similarly to the period of the intermittent power transmission for removal detection. When the start-up period TST elapses as shown in D7, the discharging operation of the discharging portion 60 is turned on as shown in D11. Accordingly, the discharging operation of the discharging portion 60 is automatically turned on upon detecting removal of the electronic apparatus 510, and power from the battery 90 can be supplied to the power supply target 100.

That is, when the deterioration in cycle characteristics of the battery 90 is considered, the discharging current of the battery 90 after full charge is ideally zero. In this regard, in the present embodiment, in addition to the discharging operation of the discharging portion 60 being turned off in the charge period (normal power transmission period) before full charge, as shown in FIG. 11, the discharging operation of the discharging portion 60 is also turned off in a period of the intermittent power transmission after full charge, as shown in FIG. 12. Accordingly, the discharging current of the battery 90 after being fully charged can be reduced to approximately zero, and a situation in which unnecessary recharging is performed can be suppressed. Therefore, the deterioration in cycle characteristics or the like of the battery 90 caused by recharging can be suppressed. Also, as a result of the discharging operation of the discharging portion 60 being turned off in a period of the intermittent power transmission after full charge, discharging of power wastefully from the battery 90 can be suppressed. Therefore, wasteful power consumption in a waiting period in which the intermittent power transmission is performed can be suppressed, and power saving can be realized.

Figure 13:
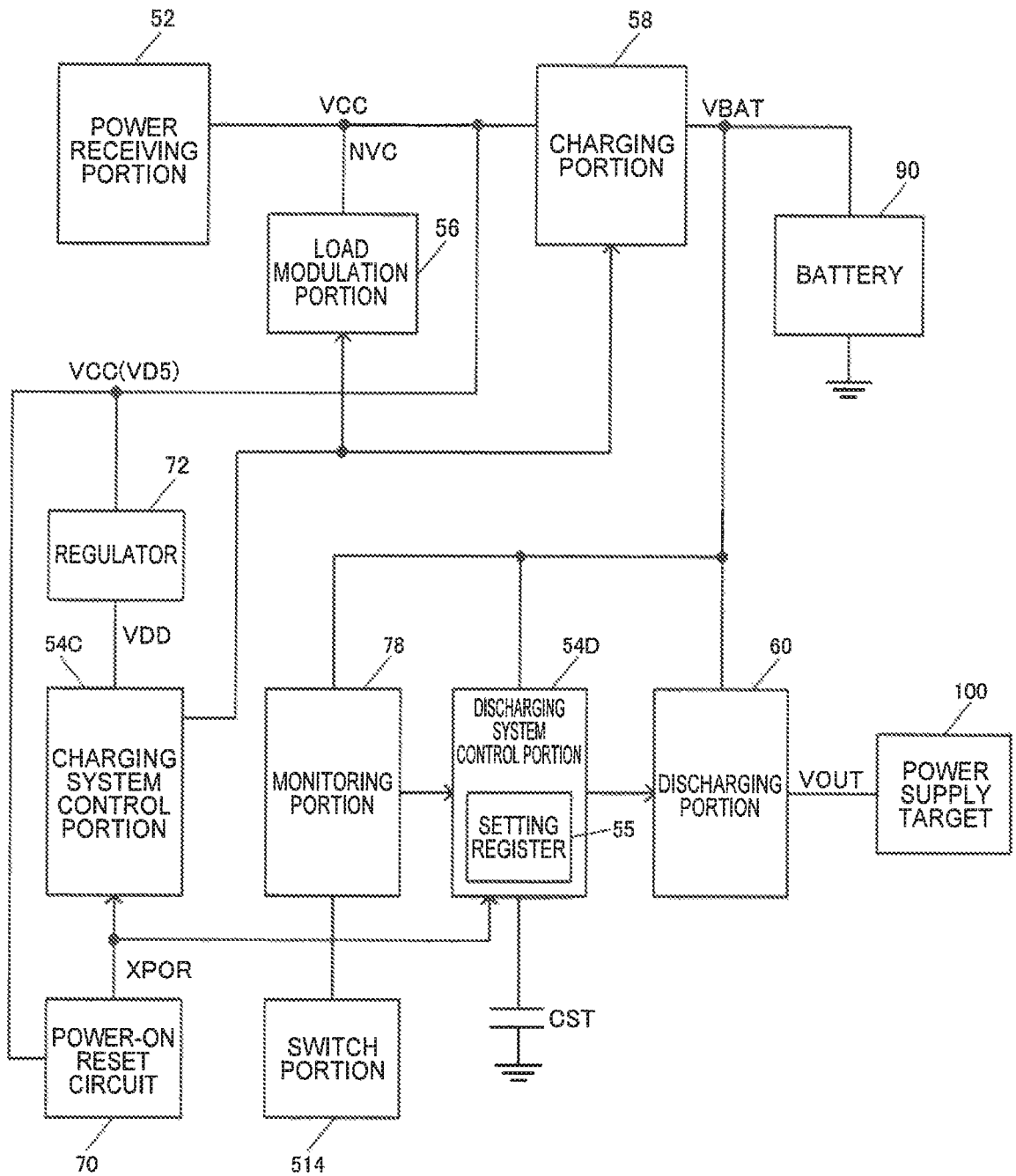
FIG. 13 is a detailed exemplary configuration of a receiving side control device.

FIG. 13 is a diagram illustrating a detailed exemplary configuration of the receiving side control device 50. As shown in FIG. 13, the charging system control portion 54C is supplied with the power supply voltage VDD based on the output voltage VCC of the power receiving portion 52 so as to operate. For example, a power supply voltage of VDD=1.8 V is generated by the regulator 72, and is supplied to the charging system control portion 54C.

Note that the power supply voltage VDD=1.8 V may be generated based on a later-described voltage VD5 (=5 V) in FIG. 22. That is, the voltage VD5 is a constant voltage that is to be generated by regulating the voltage VCC using the regulator 67 in FIG. 22. For example, in a low voltage range of VCC<5.0 V, the VD5 is equal to the VCC, and the VD5 and the VCC are equivalent voltages. Therefore, the VD5 can be used in place of the VCC.

On the other hand, the discharging system control portion 54D operates with the power supply voltage based on the battery voltage VBAT (VBAT itself or a power supply voltage generated by a regulator or the like based on the VBAT). The discharging portion 60 and the monitoring portion 78 also operates with the power supply voltage based on the battery voltage VBAT.

That is, in a period in which the electronic apparatus 510 is placed on the charger 500, and the power receiving portion 52 receives power, as shown in A2 in FIG. 9, the charging system control portion 54C is supplied with the power supply voltage VDD that is based on the output voltage VCC of the power receiving portion 52 (VD5) so as to operate. The charging system control portion 54C controls the load modulation portion 56, the charging portion 58, and the like.

On the other hand, when a state is achieved in which the electronic apparatus 510 is removed from the charger 500, as shown in A4 and A5 in FIG. 9, and the power receiving portion 52 does not receive power, the output voltage VCC of the power receiving portion 52 (VD5) decreases to 0 V, and the charging system circuits such as the charging system control portion 54C enter a reset state.

Specifically, a power-on reset circuit 70 in FIG. 13 outputs a power-on reset signal XPOR based on the voltage VCC (VD5, in actuality). In a period in which the power receiving portion 52 is receiving power, and the VCC is a sufficiently high voltage, the power-on reset signal XPOR becomes a high level (inactive), and the charging system circuits such as the charging system control portion 54C enter an operable state. On the other hand, when the electronic apparatus 510 has been removed, the power receiving portion 52 no longer receives power, and VCC (VD5) decreases, the power-on reset signal XPOR becomes a low level (active), and the charging system circuits such as the charging system control portion 54C enter a reset state.

At this time, the battery voltage VBAT is supplied to the discharging system control portion 54D, the discharging portion 60, and the monitoring portion 78, which are discharging system circuits. Therefore, even in a period in which the power-on reset signal XPOR becomes a low level, and the charging system circuits are in a reset state, the discharging system control portion 54D, the discharging portion 60, and the monitoring portion 78 are in an operable state with the power supply voltage based on the battery voltage VBAT being supplied. Accordingly, as shown in FIGS. 11 and 12, after the electronic apparatus 510 is removed, the discharging operation of the discharging portion 60 is turned on, and thus an operation in which power of the battery 90 is supplied to the power supply target 100, or the like can be realized.

Also, in the present embodiment, the start capacitor CST (hereinafter simply referred to as a capacitor CST) for starting up the discharging operation is provided, as shown in FIG. 13. The discharging system control portion 54D starts discharging of the capacitor CST (capacitor that is charged when the power receiving portion is receiving power) that is charged by the power received by the power receiving portion 52, when the output voltage VCC of the power receiving portion 52 (VD5) decreases below the judgement voltage (3.1 V). As shown in C4 in FIG. 11 and D9 in FIG. 12, when the electronic apparatus 510 is removed, and the voltage VCC (VD5) decreases below 3.1 V, which is the judgement voltage, discharging of the capacitor CST starts. When the charge voltage of the capacitor CST has decreased below the threshold voltage VT, the discharging operation of the discharging portion 60 starts, as shown in C8 in FIG. 11 and D11 in FIG. 12. By using such a capacitor CST, how much the start-up period TST (5 s) shown in FIGS. 11 and 12 has elapsed can be measured.

Also, in the present embodiment, in the case where the power transmitting device 10 that succeeded in landing detection has responded to the power receiving device 40, the operation mode is set to the second mode (off-start mode) based on this response. That is, the setting of the operation mode to the setting register 55 described in FIG. 5 is performed based on the response from the power transmitting device 10.

Figure 14:
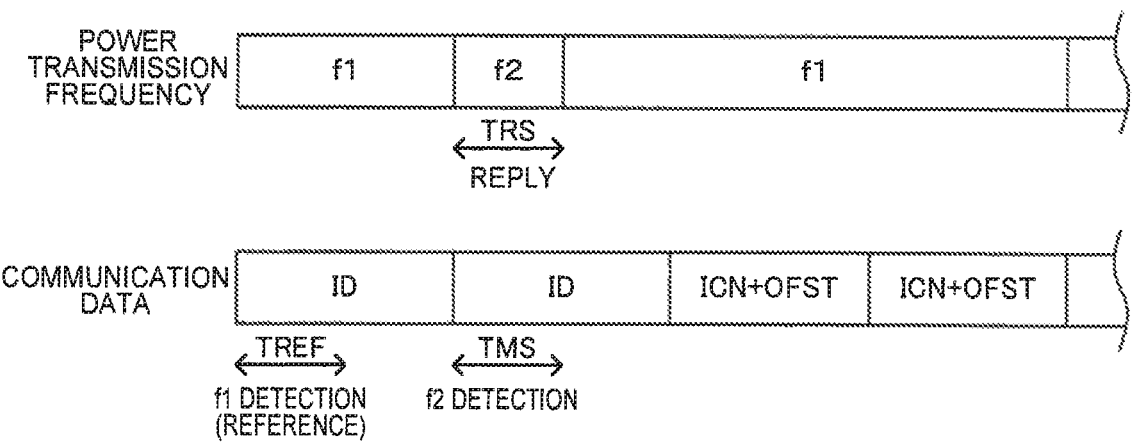
FIG. 14 is a diagram for describing a response method of the power transmitting device.

FIG. 14 is a diagram for describing an example of the method of reply performed by the power transmitting side, for example. The power transmitting side transmits power with a power transmission frequency fck=f1 in a normal state, for example. The power receiving side, after having transmitted the dummy data for landing detection, transmits ID information (authentication information, ID code) for authenticating the power transmitting device 10 (charger) to the power transmitting side. In FIG. 14, the power receiving side transmits the ID information twice. The power transmitting side that has checked the first ID information makes a reply with respect to the authentication by the ID information by changing the power transmission frequency fck from f1 to f2 in a response period TRS in the second ID communication period. The power receiving side determines that landing has occurred on a proper power transmitting device 10 (charger) in the case where the power transmitting side has made such a reply. Accordingly, simplified authentication processing can be realized. The power receiving device 40, upon the authentication being successful, transmits an IC number (ICN) and off-start flag (OFST) to the power transmitting side.

Specifically, in FIG. 14, the power receiving side detects the power transmission frequency fck=f1 in a period TREF in the first ID communication period. Then, the power receiving side detects the power transmission frequency fck=f2 in a period TMS in the second ID communication period using the fck=f1 in the period TREF as a reference frequency. The power receiving side determines that the power transmitting side has made a reply in the case where the power transmission frequency fck=f2 is detected in the period TMS.

For example, the control device 50 on the power receiving side shapes a coil end signal that appears at one end of the secondary coil L2 using a hysteresis-type comparator, for example, and thereby extracts a rectangular wave signal that corresponds to the power transmission signal waveform (power reception signal waveform). Then, the control device 50 measures the power transmission frequency fck using the extracted rectangular wave signal. Specifically, the control device 50 on the power receiving side includes an oscillator circuit (CR oscillator circuit, for example) therein, and measures the power transmission frequency fck (power reception frequency corresponding to the power transmission frequency) by performing measurement in which the length of a power transmission period T=1/fck (32×T, specifically) is measured by counting a clock signal generated based on an oscillation signal of the oscillator circuit. Note that the reply of the power transmitting side is not limited to the reply by a change in the power transmission frequency, and the reply may be a reply by a change in the duty ratio or a change in the amplitude of the power transmission signal waveform, for example.

In the present embodiment, in the case where this response (f2) is received from the power transmitting device 10, the operation mode is set to the second mode, which is an off-start mode. Then, as shown in FIG. 14, the flag OFST for notifying that the off-start mode is set is transmitted to the power transmitting device 10 as the notification information described in FIG. 5. That is, the flag OFST is the notification information for notifying which of the first and second modes the operation mode is set to. For example, the flag OFST=0 is transmitted when the first mode is set, and the flag OFST=1 is transmitted when the second mode is set. Accordingly, the power transmitting side can recognize which of the first and second modes the operation mode is set to.

For example, when a product is manufactured and shipped, charging is performed by a dedicated charger as described above, and the operation mode is automatically set to the second mode. Upon receiving the flag OFST=1 from the power receiving side, an LED or the like, which is the reporting portion 16 in FIG. 8 is lit. In this way, a worker at the manufacturing site can confirm that the operation mode is set to the second mode, which is the off-start mode.

Figure 15:
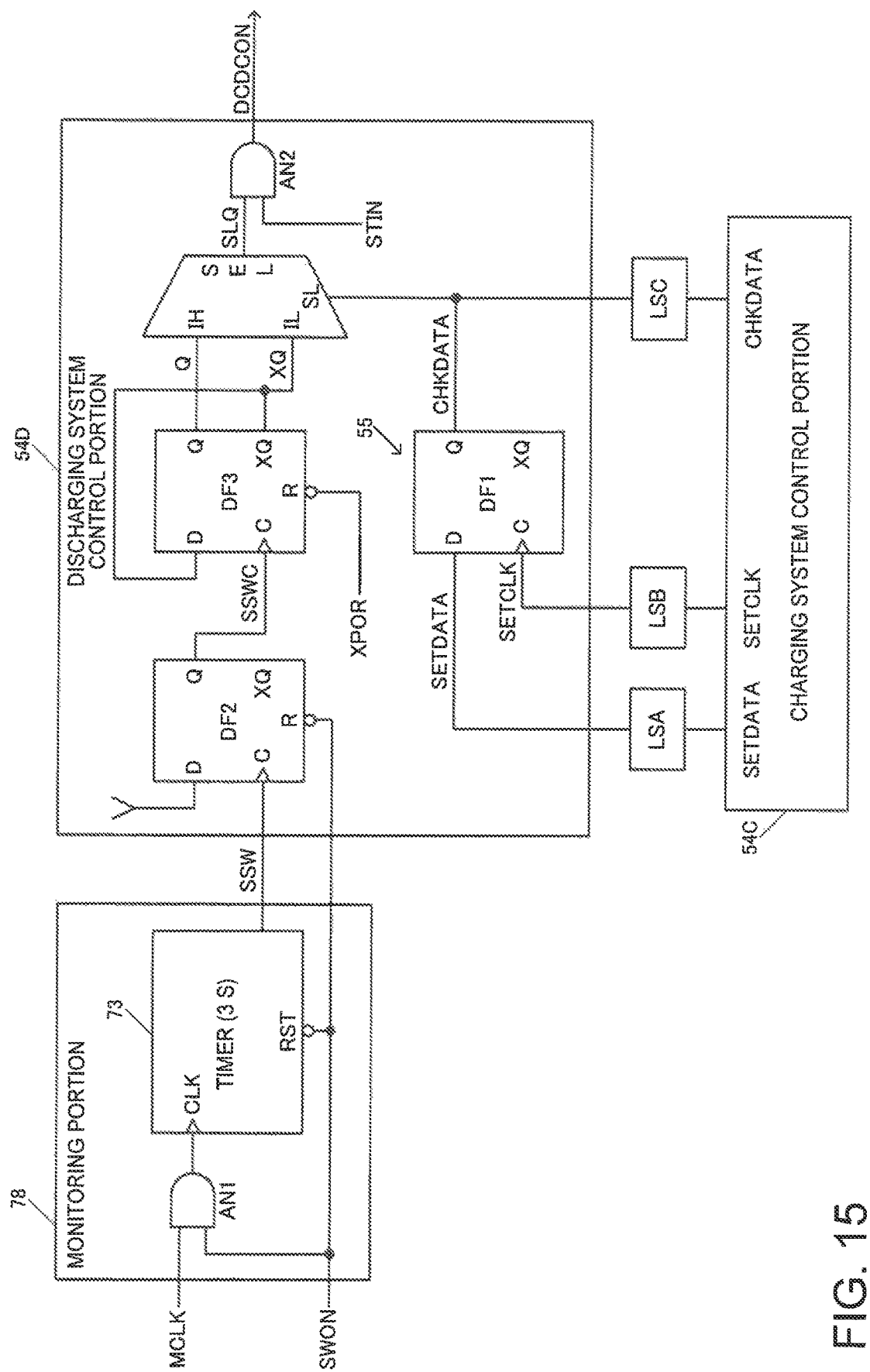
FIG. 15 is a detailed exemplary configuration of a discharging system control portion and the monitoring portion.

A detailed exemplary configuration of the discharging system control portion 54D and the monitoring portion 78 is shown in FIG. 15. The monitoring portion 78 includes the timer 73 and an AND circuit AN1. The clock signal MCLK and a signal SWON are input to the AND circuit AN1. The MCLK is a clock signal generated by the oscillator circuit 74, as described in FIG. 3. The signal SWON corresponds to an inversion signal of the signal XCE. An output signal of the AND circuit AN1 is input to a CLK terminal (clock terminal) of the timer 73, and the signal SWON is input to a RST terminal (reset terminal).

The discharging system control portion 54D includes flip-flops DF1, DF2, and DF3, a selector SEL, and an AND circuit AN2.

The flip-flop DF1 corresponds to the setting register 55 described in FIG. 1 and the like. Signals SETDATA and SETCLK are respectively input to a D terminal (data terminal) and a C terminal (clock terminal) of the flip-flop DF1 from the charging system control portion 54C via respective level shifters LSA and LSB. The flip-flop DF1 outputs a signal CHKDATA from a Q terminal (output terminal), and the CHKDATA is input to the charging system control portion 54C via a level shifter LSC. Since the voltages of the power supply voltages that are respectively supplied to the discharging system control portion 54D and the charging system control portion 54C are different, the level shifters LSA, LSB, and LSC are needed to convert the voltage levels of the signals.

The detection signal SSW of the timer 73 is input to a C terminal of the flip-flop DF2, and the signal SWON is input to an R terminal (reset terminal). The level of a D terminal of the flip-flop DF2 is set to the high potential side power supply voltage.

An output signal SSWC of the flip-flop DF2 is input to a C terminal of the flip-flop DF3, and the power-on reset signal XPOR described in FIG. 13 is input to an R terminal. The flip-flop DF3 outputs a signal Q from a Q terminal, and outputs an inversion signal XQ of the signal Q from an XQ terminal (inverted output terminal). The signal XQ is input to a D terminal of the flip-flop DF3.

The selector SEL selects one of the signals Q and XQ based on the signal CHKDATA, and outputs the selected signal as a signal SLQ. For example, in the case where the operation mode is the first mode, a low level is held in the flip-flop DF1 serving as the setting register 55, and the signal CHKDATA becomes a low level. When the signal CHKDATA is at a low level, the selector SEL selects the signal XQ so as to output as the signal SLQ. On the other hand, when the operation mode is the second mode, because the flip-flop DF1 holds a high level, the signal CHKDATA becomes a high level. When the signal CHKDATA is at a high level, the selector SEL selects the signal Q so as to output as the signal SLQ. The AND circuit AN2 receives the signal SLQ and a signal STIN, and outputs a signal DCDCON.

Figure 16:
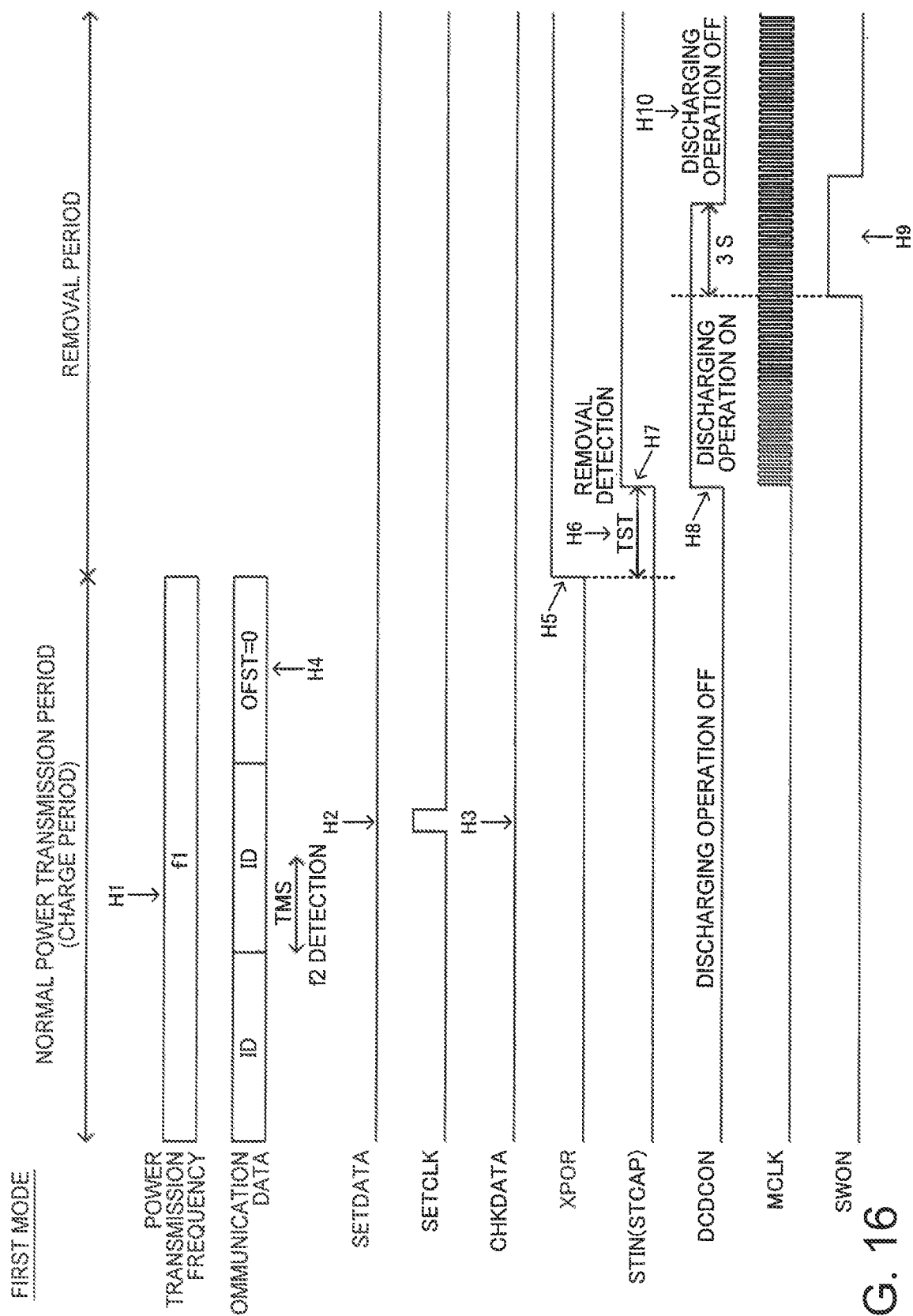
FIG. 16 is a waveform diagram for describing an operation in a first mode.

FIG. 16 is a waveform diagram for describing operations in the first mode. In the case of setting the operation mode to the first mode, the power transmitting device 10 does not perform the response described in FIG. 14, as shown in H1 in FIG. 16, and therefore the power transmission frequency does not change and stays as f1. Therefore, the charging system control portion 54C that performs receiving processing of the response outputs the signal SETDATA at a low level and the clock pulse signal SETCLK, as shown in H2. Accordingly, a low level is held in the flip-flop DF1 serving as the setting register 55. The holding of this L level means that the first mode is set in the setting register 55.

Also, the charging system control portion 54C confirms that the first mode is set to the setting register 55 as a result of receiving the signal CHKDATA at a low level from the flip-flop DF1. The charging system control portion 54C controls the load modulation portion 56 so as to transmit the flag the OFST=0 to the power transmitting device 10 as shown in H4.

Next, the power-on reset signal XPOR changes from a low level to a high level, as shown in H5, the reset of the flip-flop DF3 is cancelled, and the flip-flop DF3 outputs the signal Q at a low level and the signal XQ at a high level. In this case, the flip-flop DF1 serving as the setting register 55 is set to the first mode, and the signal CHKDATA is at a low level, and therefore the selector SEL selects the signal XQ at a high level and outputs the signal XQ to the AND circuit AN2 as the signal SLQ.

When the start-up period TST has elapsed due to discharging of the capacitor CST in FIG. 13, as shown in H6, the signal STIN changes from a low level to a high level, as shown in H7. Then, the output signal DCDCON of the AND circuit AN2 that has received the signals SLQ and STIN at a high level changes from a low level to a high level, as shown in H8. Accordingly, the discharging operation of the discharging portion 60 that was off in the normal power transmission period (charge period) is set to on, and power from the battery 90 is supplied to the power supply target 100. That is, the first mode in which the discharging operation is turned on when removal is detected is realized.

Thereafter, when a long pressing operation in which the switch portion 514 is pressed for 3 s or more has been performed, as shown in H9, the discharging operation is switched from on to off, as shown in H10. That is, when the switch portion 514 is pressed down, the signal SWON is changed from a low level to a high level, and counting processing in which the elapsing of 3 s is measured by the timer 73 in FIG. 15 is started, as shown in H9. If the pressing-down operation continues after 3 s has elapsed and the long pressing operation of 3 s or more of the switch portion 514 is detected, the detection signal SSW of the timer 73 changes from a low level to a high level, and the output signal SSWC of the flip-flop DF2 changes from a low level to a high level. Accordingly, the holding level of the flip-flop DF3 that receives the signal XQ at the D terminal changes from a low level to a high level, and the signal XQ changes from a high level to a low level. As a result, the output signal SLQ of the selector SEL that is selecting the signal XQ changes to a low level, and the signal DCDCON also changes to a low level, and therefore the discharging operation switches from on to off, as shown in H10 in FIG. 16.

Figure 17:
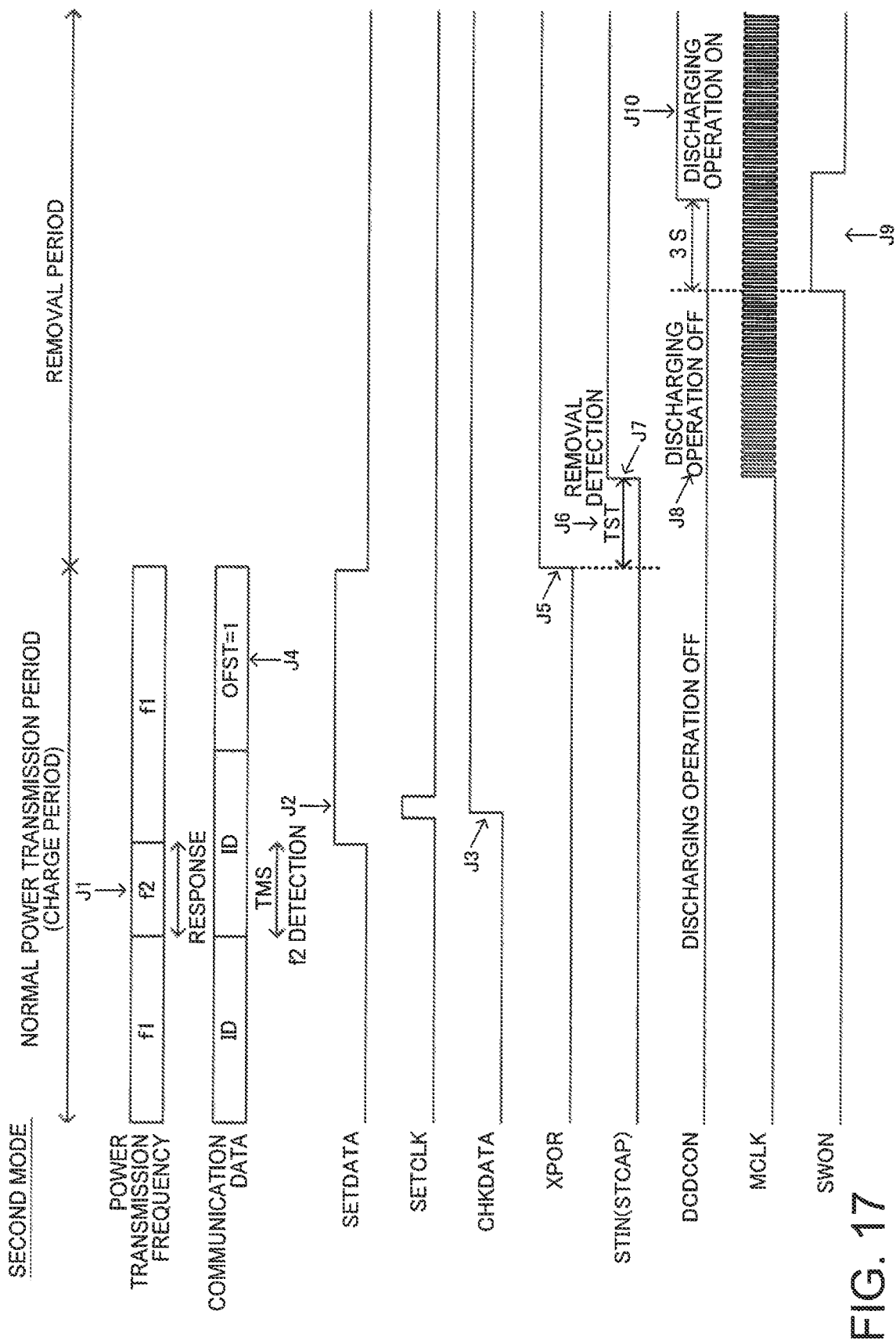
FIG. 17 is a waveform diagram for describing an operation in a second mode.

FIG. 17 is a waveform diagram for describing operations in the second mode. In the case of setting the operation mode to the second mode, the power transmitting device 10 performs the response described in FIG. 14, as shown in J1 in FIG. 17, and the power transmission frequency changes from f1 to f2 in the response period. Accordingly, the charging system control portion 54C outputs the signal SETDATA at a high level and the clock pulse signal SETCLK, as shown in J2. As a result, the flip-flop DF1 serving as the setting register 55 holds a high level. The holding of this H level means that the second mode is set to the setting register 55.

Also, the charging system control portion 54C confirms that the second mode is set to the setting register 55 as a result of receiving the signal CHKDATA at a high level from the flip-flop DF1. The charging system control portion 54C controls the load modulation portion 56 so as to transmit the flag OFST=1 to the power transmitting device 10 as shown in J4. Accordingly, the power transmitting side can confirm that the operation mode is set to the second mode.

Next, the power-on reset signal XPOR changes from a low level to a high level, as shown in J5, and the flip-flop DF3 outputs the signal Q at a low level and the signal XQ at a high level. In this case, the flip-flop DF1 is set to the second mode, and the signal CHKDATA is at a high level, and therefore the selector SEL selects the signal Q at a low level and outputs the signal Q to the AND circuit AN2 as the signal SLQ.

Even if the start-up period TST elapsed, and the signal STIN has changed from a low level to a high level, as shown in J6 and J7, since the signal SLQ that is input to the AND circuit AN2 is at a low level, the output signal DCDCON of the AND circuit AN2 does not change and remains at a low level, as shown in J8. Accordingly, the discharging operation of the discharging portion 60 is set to off. That is, the second mode in which the discharging operation is set to off when removal is detected is realized.

Thereafter, when a long pressing operation in which the switch portion 514 is pressed for 3 s or more has been performed, as shown in J9, the discharging operation is switched from off to on, as shown in J10. That is, if the pressing-down operation on the switch portion 514 continues after 3 s, which is measured by the timer 73, has elapsed and the long pressing operation of 3 s or more of the switch portion 514 is detected, the detection signal SSW of the timer 73 changes from a low level to a high level. Accordingly, the output signal SSWC of the flip-flop DF2 also changes from a low level to a high level, the holding level of the flip-flop DF3 changes from a low level to a high level, and the signal Q changes from a low level to a high level. As a result, the output signal SLQ of the selector SEL that selects the signal Q changes to a high level, and the signal DCDCON also changes to a high level, and therefore the discharging operation changes from off to on, as shown in J10 in FIG. 16.

According to the present embodiment, as described above, the operation mode can be set to the flip-flop DF1 serving as the setting register 55. It becomes possible that, in the case where the operation mode is set to the first mode, the discharging operation is turned on when removal is detected, and in the case where the operation mode is set to the second mode, the discharging operation is turned off when removal is detected. Also, it becomes possible that, upon detecting a long pressing operation on the switch portion 514, the discharging operation is switched from on to off, or from off to on.

7. Communication Method

Figure 18:
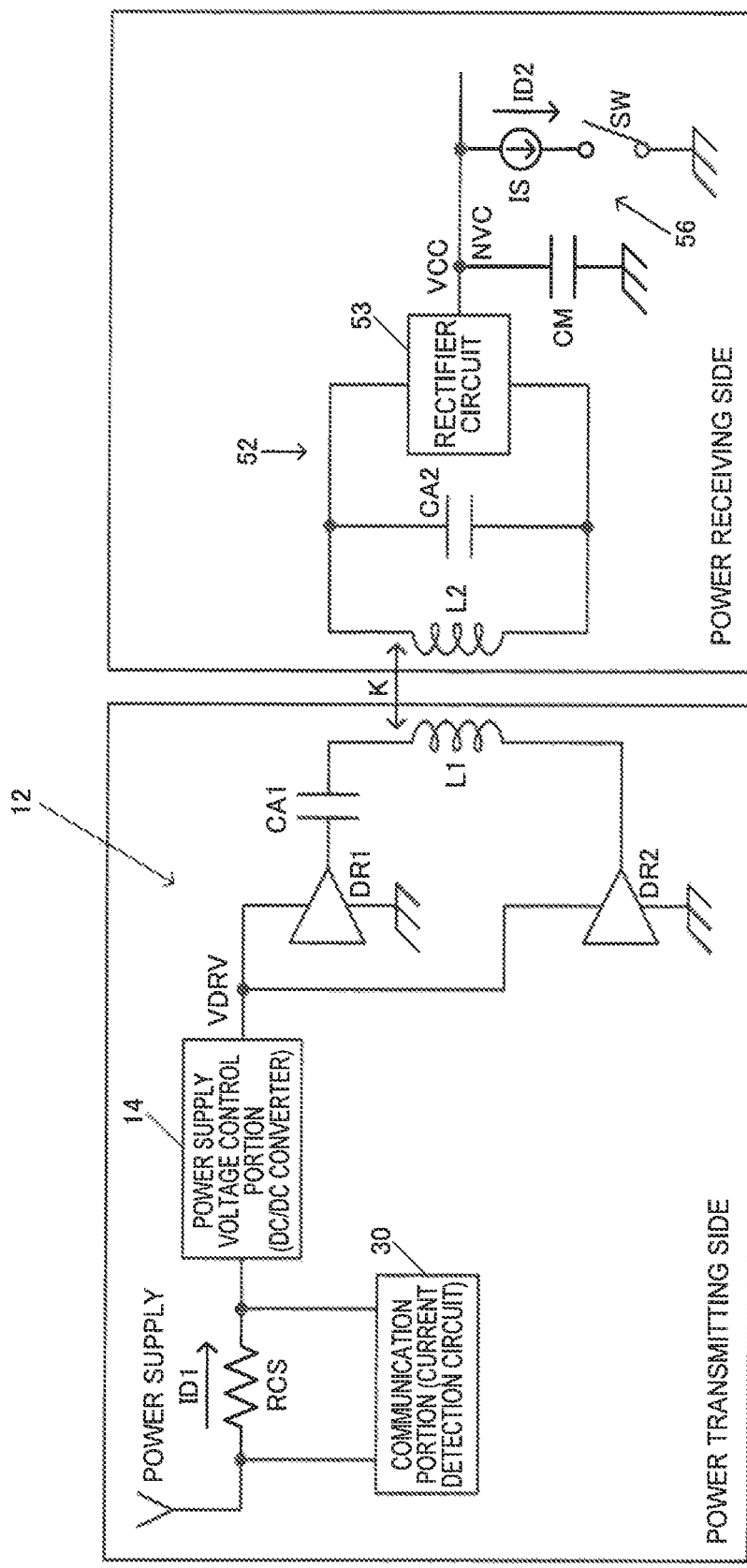
FIG. 18 is a diagram for describing a communication method using load modulation.

FIG. 18 is a diagram for describing a communication method by load modulation. The power transmission drivers DR1 and DR2 drive the primary coil L1 on the power transmitting side based on the power supply voltage VDRV supplied from the power supply voltage control portion 14, as shown in FIG. 18.

Meanwhile, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and a capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 7A, for example) on the power transmitting side and the power supply voltage control portion 14. A power supply voltage is supplied from the power supply to the power supply voltage control portion 14 via the sense resistor RCS. A current 1D1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result. The communication portion 30 can include a current detection circuit that detects a current ID1 that flows from the power supply to the power transmission portion 12, a comparator circuit that compares the detection voltage detected by the current detection circuit and a judgement voltage, and a demodulation portion that determines the load modulation pattern based on the result of comparison by the comparator circuit.

The control portion 54 (charging system control portion) in FIG. 8 measures the power transmission frequency of a power transmission signal from the power transmitting device 10, generates a control signal for transmitting communication data, and outputs the control signal to the load modulation portion 56. The switching element SW in FIG. 18 is subjected to on/off control by this control signal, and thus the load modulation portion 56 is caused to perform load modulation corresponding to the communication data.

The load modulation portion 56 performs load modulation by changing the load state (load by load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise.

Figure 19:
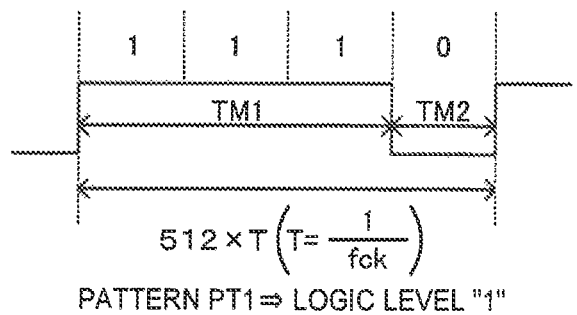
FIG. 19 is a diagram for describing a communication method of the present embodiment.
Figure 19:
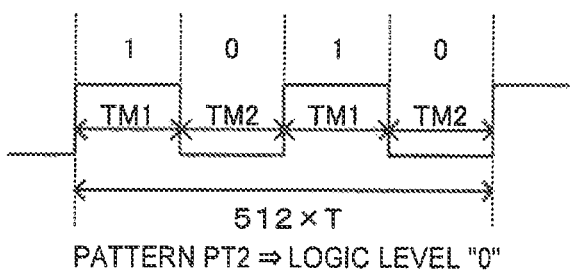

Therefore, according to the present embodiment, as shown in FIG. 19, the load modulation portion 56 on the power receiving side performs load modulation such that the load modulation pattern is a first pattern PT1 for a first logic level "1" of the communication data that is to be transmitted to the power transmitting device 10. On the other hand, the load modulation portion 56 on the power receiving side performs load modulation such that the load modulation pattern is a second pattern PT2 that is different from the first pattern PT1 for a second logic level "0" of the communication data.

The communication portion 30 (demodulation portion) on the power transmitting side determines that the communication data is communication data of the first logic level "1" if the load modulation pattern is the first pattern PT1. On the other hand, the communication portion 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation portion 56 is a high load, for example. Specifically, in FIG. 19, a period TM1 in the first load state is a period in which the switching element SW in the load modulation portion 56 is turned on and the current of the current source IS flows from the node NVC to the GND side, and is a period corresponding to a high level (bit=1) in the first and second patterns PT1 and PT2. On the other hand, the second load state is a state where the load on the power receiving side set by the load modulation portion 56 is a low load, for example. Specifically, in FIG. 19, a period TM2 in the second load state is a period in which the switching element SW in the load modulation portion 56 is turned off, and is a period corresponding to a low level (bit=0) in the first and second patterns PT1 and PT2.

In FIG. 19, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 19, the first pattern PT1 is a pattern corresponding to a bit pattern (1110), for example. The second pattern PT2 is a pattern corresponding to a bit pattern (1010), for example. In these bit patterns, bit=1 corresponds to a state in which the switching element SW in the load modulation portion 56 is turned on, and bit=0 corresponds to a state in which the switching element SW in the load modulation portion 56 is turned off.

For example, in the case where the bit in communication data to be transmitted is a logic level "1", the switching element SW in the load modulation portion 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in communication data to be transmitted is a logic level "0", the switching element SW in the load modulation portion 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the power transmission frequency (frequency of the drive clock signal FCK) in the power transmission portion 12 is fck, and the power transmission period is T=1/fck, the length of each of the first and second patterns PT1 and PT2 is expressed as 512×T, for example. In this case, the length of one bit section can be expressed as (512×T)/4=128×T. Accordingly, in the case where the bit in the communication data is at a logic level "1", the switching element SW in the load modulation portion 56 is turned on and off, on the power receiving side, in the bit pattern (1110) that corresponds to the first pattern PT1 at an interval 128×T, for example. Also, in the case where the bit in the communication data is at a logic level "0", the switching element SW in the load modulation portion 56 is turned on and off, on the power receiving side, in the bit pattern (1010) that corresponds to the second pattern PT2 at the interval 128×T, for example.

Figure 20:
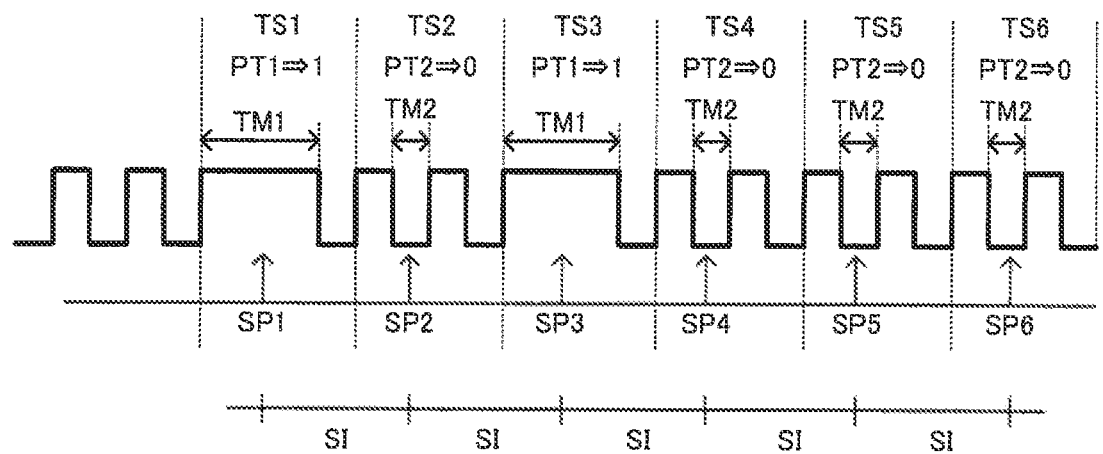
FIG. 20 is a diagram for describing the communication method of the present embodiment.

On the other hand, a detection operation and fetching processing for communication data are performed on the power transmitting side by a method shown in FIG. 20, for example. For example, the communication portion 30 (demodulation portion) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 20 are sampling points that are set at sampling intervals SI. The sampling interval SI is an interval that corresponds to the length of the load modulation pattern. For example, in FIG. 19, the length of each of the first and second patterns PT1 and PT2 is 512×T (=512/fck), and therefore the length of the sampling interval SI is also 512×T.

In FIG. 20, the load modulation patterns in the periods TS1, TS2, TS3, TS4, TS5, and TS6 are respectively PT1, PT2, PT1, PT2, PT2, and PT2. Accordingly, in the case shown in FIG. 20, communication data (101000) having a number of bits-6, for example, is taken in by performing sampling on the load modulation pattern from the first sampling point SP at the sampling intervals SI.

Specifically, in the case where the width of the period TM1 in the first load state is within a first range width (220×T to 511×T), the first sampling point SP1 is set within the period TM1 in the first load state, as shown in FIG. 20. That is, in the case where the width of the period TM1 in which the signal level is at a high level is within the first range width, bit synchronization is performed, and the first sampling point SP1 is set at the center point, for example, of the period TM1. Then, sampling is performed at the sampling intervals SI from the set first sampling point SP1. Then, if the level of the signal that has been taken in is at a high level (first load state), the logic level is determined to be "1" (first pattern PT1), and if the level of the signal that has been taken in is at a low level (second load state), the logic level is determined to be "0" (second pattern PT2).

Here, the first range width (220×T to 511×T) is a range width that is set corresponding to the period TM1 (384×T) in the first load state in the first pattern PT1. That is, the width of the period TM1 fluctuates caused by noise that is superimposed onto the signal or the like, for example. A typical value of the width of the period TM1 in the first pattern PT1 is a width 128×3×T=384×T that corresponds to an amount of 3 bits (111). Accordingly, the first range width 220×T to 511×T is set so as to include this 384×T. The period of a high level within the first range width 220×T to 511×T is determined to be the period TM1 in the first pattern PT1, and bit synchronization for setting the first sampling point SP1 is performed. In this way, even in a case where noise is superimposed on the signal, an adequate first sampling point SP1 can be set by performing adequate bit synchronization.

Note that, at each of the sampling points SP2 to SP6 in FIG. 20, the width of load state period that includes the sampling point may be verified to be in a predetermined range width.

For example, in the case where, at the second sampling point SP2, the load state is the first load state (high level), and the width of the first load state period TM1 that includes the second sampling point SP2 is within the first range width (220×T to 511×T), the load modulation pattern at the second sampling point SP2 is determined to be the first pattern PT1 (logic level "1").

On the other hand, in the case where, at the second sampling point SP2, the load state is the second load state (low level), and the width of the second load state period TM2 that includes the second sampling point SP2 is within the second range width (80×T to 150×T, for example), the load modulation pattern at the second sampling point SP2 is determined as being the second pattern PT2 (logic level "0").

Here, the second range width (80×T to 150×T) is a range width that is set corresponding to the second load state period TM2 (128×T) in the second pattern PT2. Since the typical value of period TM2 is 128×T corresponding to 1 bit, the second range width 80×T to 150×T is set so as to include the period 128×T.

In the present embodiment as described above, the logic level of the communication data is judged by determining the load modulation pattern. Accordingly, even in a situation in which there is a large amount of noise, proper detection of the communication data is made possible. That is, the width of the first load state (high level) period TM1 is very different in the first and second patterns PT1 and PT2 in FIG. 19, and the logic level of each bit of the communication data is detected by identifying patterns as a result of identifying the difference of the period TM1 width in the present embodiment. Therefore, even in a case where the period TM1 width or the like at the sampling point SP1 changes due to noise, for example, proper detection of the communication data is made possible. Also, since the sampling points SP2, SP3, SP4, . . . , thereafter can be set by simple processing based on the sampling interval SI, there is an advantage in that the processing load in the detection operation of the communication data can be reduced.

An example of the communication data format used in the present embodiment is shown in FIGS. 21A and 21B.

In FIG. 21A, the communication data is constituted by 64 bits, and one packet is configured by these 64 bits. The data of the first set of 16 bits is 0000h. In the case where normal power transmission (or intermittent power transmission) is started on the power transmitting side by detecting the load modulation on the power receiving side, for example, a certain amount of time is required before the current detection circuit or the like in the communication portion 30 operates and the communication data can be properly detected. Therefore, 0000h that is dummy (null) data is set to the first 16 bits. Various processing necessary for bit synchronization, for example, is performed on the power transmitting side in a communication period of the first 16 bits 0000h.

A data code and information on the rectified voltage (VCC) are set in the second set of 16 bits. The data code is a code for specifying data that is to be transmitted by the third set of 16 bits, as shown in FIG. 21B. The rectified voltage (VCC) is used as transmitting power setting information of the power transmitting device 10.

Information such as temperature, a battery voltage, a battery current, a status flag, number of cycles, an IC number/charging execution/off start, or ID is set to the third set of 16 bits according to the setting designated by the data code. The temperature is a battery temperature or the like, for example. The battery voltage and the battery current are information representing the charge state of the battery 90. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle time) is information representing the number of charging times. The IC number is a number for specifying a control device IC. The charging execution flag (CGO) is a flag that indicates that the power transmitting side that has been authenticated is appropriate and charging is executed based on transmitting power from the power transmitting side. The off-start flag (OFST) is a flag for notifying that the discharging operation is to be set to off when removal is detected. CRC information is set in the fourth set of 16 bits.

Note that the communication method of the present embodiment is not limited to the method described in FIGS. 19 to 21B and the like, and various modifications can be implemented. For example, although the first pattern PT1 is associated with the logic level "1" and the second pattern PT2 is associated with the logic level "0" in FIG. 19, the association relationship may be reversed. Also, the first and second patterns PT1 and PT2 in FIG. 19 are examples of the load modulation patterns, and the load modulation patterns of the present embodiment are not limited thereto and various modifications can be implemented. For example, although the first and second patterns PT1 and PT2 are set to have the same length in FIG. 19, they may be set to have different lengths. Also, in FIG. 19, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIG. 19 can be adopted. Also, the communication data format and the communication processing are not limited to the methods described in the present embodiment and various modifications can be implemented.

8. Power Receiving Portion and Charging Portion

Figure 22:
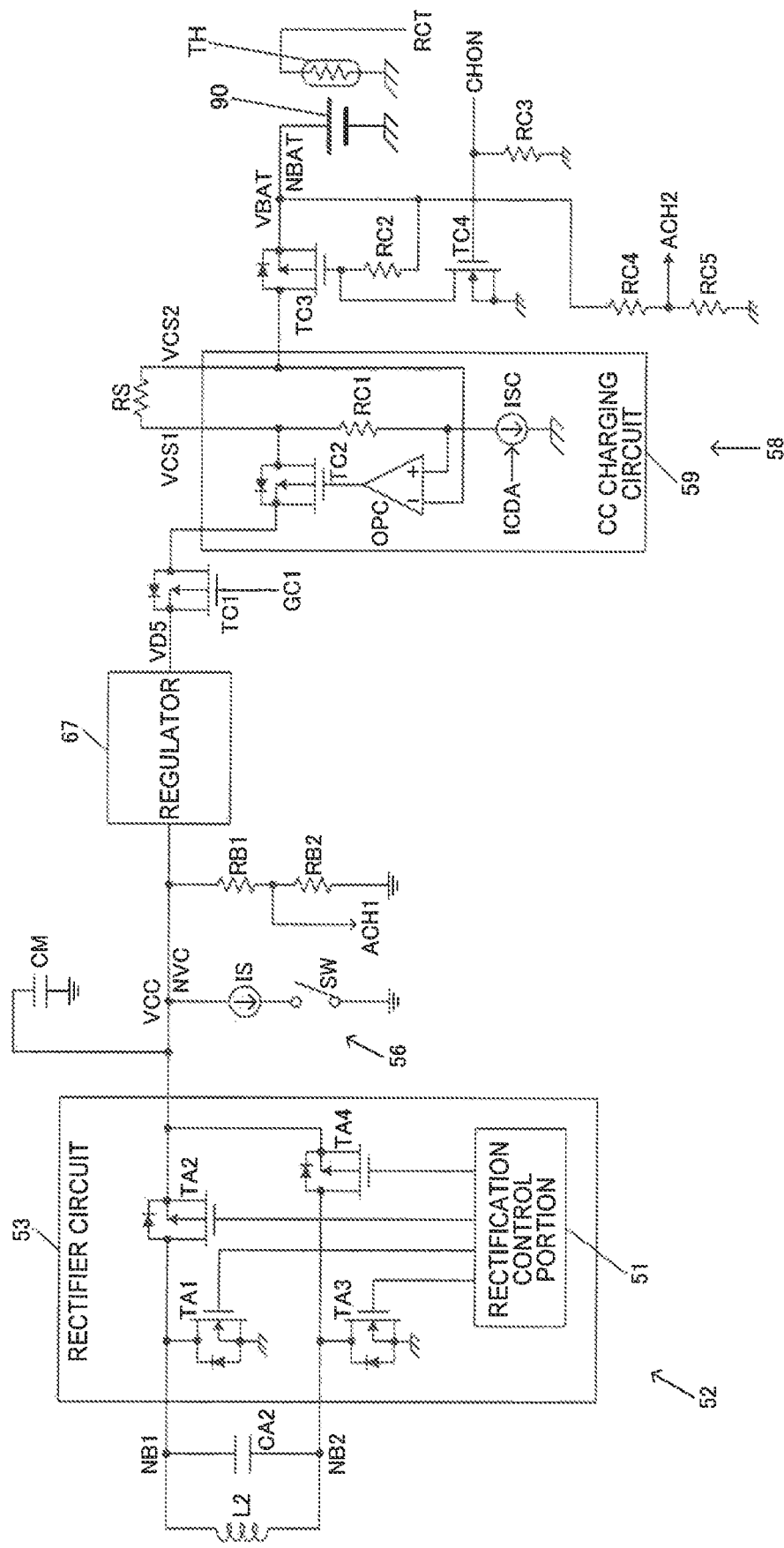
FIG. 22 is a detailed exemplary configuration of a power receiving portion and a charging portion.

A detailed exemplary configuration of the power receiving portion 52, the charging portion 58, and the like is shown in FIG. 22. The rectifier circuit 53 in the power receiving portion 52 includes transistors TA1, TA2, TA3, and TA4 for rectification and a rectification control portion 51 for controlling these transistors TA1 to TA4, as shown in FIG. 22. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65, for example. Accordingly, monitoring of the rectified voltage VCC is made possible, and thus power control based on the VCC and control of communication start and charging start based on the VCC can be realized.

The regulator 67 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the battery voltage VBAT exceeding a given voltage is detected, for example. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. Through virtual short of the operational amplifier OPC, the transistor TC2 is controlled such that the voltage (non-inverting input terminal voltage) on one end of the resistor RC1 is equal to the voltage VCS2 (inverting input terminal voltage) on another end of the sense resistor RS, which is an external component. The current that flows in the current source ISC by the control of the signal ICDA is represented as IDA, and the current that flows in the sense resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A transistor TC3 is provided between an output node of the CC charging circuit 59 and a supply node NBAT of the battery voltage VBAT. A drain of an N-type transistor TC4 is connected to a gate of the P-type transistor TC3, and a charging control signal CHON from the control portion 54 is input to a gate of the transistor TC4. Also, a pull-up resistor RC2 is provided between the gate of the transistor TC3 and the node NBAT, and a pull-down resistor RC3 is provided between the gate of the transistor TC4 and a GND (power supply on a low potential side) node. The power supply switch 42 in FIG. 8 is realized by the transistor TC3 (TC4).

When charging is performed, the control portion 54 sets the control signal CHON to a high level (active). Accordingly, the N-type transistor TC4 is turned on, and the gate voltage of the P-type transistor TC3 becomes a low level. As a result, the transistor TC3 is turned on, and the charging of the battery 90 is performed.

On the other hand, when the control portion 54 sets the control signal CHON to a low level (inactive), the N-type transistor TC4 is turned off. The gate voltage of the P-type transistor TC3 is pulled up to the battery voltage VBAT by the resistor RC2, and as a result, the transistor TC3 is turned off and the charging of the battery 90 is stopped.

Also, when the power supply voltage of the charging system becomes lower than the operation lower limit voltage of the circuit, the gate voltage of the transistor TC4 is pulled down to GND by the resistor RC3, and thus the transistor TC4 is turned off. Also, the gate voltage of the transistor TC3 is pulled up to the battery voltage VBAT by the resistor RC2, and thus the transistor TC3 is turned off. In this way, when the power receiving side is removed, and the power supply voltage becomes lower than the operation lower limit voltage, as a result of the transistor TC3 being turned off, the path between the output node of the CC charging circuit 59 and the node NBAT of the battery 90 is electrically cut off. Accordingly, reverse flow from the battery 90 when the power supply voltage becomes less than or equal to the operation lower limit voltage can be prevented.

Resistors RC4 and RC5 are provided in series between the node NBAT and the GND node, and a voltage ACH2 that is generated by voltage-dividing the battery voltage VBAT with the resistors RC4 and RC5 is input to the A/D converter circuit 65. Accordingly, monitoring of the battery voltage VBAT is made possible, and various types of control can be realized based on the charge state of the battery 90. Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the power transmitting side control device, the power receiving side control device, the power transmitting device, the power receiving device are not limited to those described in this embodiment either, and various modifications can be implemented.

What is claimed is:

1. A control device that is to be included in a power receiving device that receives power supplied from a power transmitting device, the control device comprising:
    a power supply portion that charges a battery based on power received by a power receiving portion, and performs a power supply operation in which power is supplied to a power supply target based on power discharged from the battery; and
    a control portion that controls the power supply portion, wherein:
        the control portion is configured to operate in a first mode and a second mode as operation modes for controlling the power supply operation of the power supply portion,
        when it is detected that the power receiving device has been removed from the power transmitting device, the control portion: 1) turns on the power supply operation of the power supply portion when an operation mode is set to the first mode, and 2) turns off the power supply operation of the power supply portion when the operation mode is set to the second mode,
        the power supply portion charges the battery based on the power received by the power receiving portion contactlessly received from the power transmitting device,
        the power supply portion includes:
            a charging portion that charges the battery based on the power received by the power receiving portion, and
            a discharging portion that performs an operation of discharging the battery and supplies the power discharged from the battery to the power supply target, and
        the control portion, when the operation mode is set to the first mode, starts the discharging operation by turning on the discharging operation of the discharging portion after a start-up period of the discharging operation has elapsed, the start-up period being initiated by a decrease in an output voltage of the power receiving portion.

2. The control device according to claim 1,
    wherein the control portion turns off the power supply operation of the power supply portion in a charge period in which the battery is charged based on the power received by the power receiving portion.

3. The control device according to claim 2, further comprising:
    a monitoring portion that monitors an operation state of a switch portion,
    wherein the control portion switches the power supply operation from on to off or off to on, based on a result of monitoring the operation state of the switch portion, in a removed period in which the power receiving device is removed from the power transmitting device.

4. The control device according to claim 1,
    wherein at least the second mode is set as the operation mode by an external device that is different from the power transmitting device.

5. The control device according to claim 4, further comprising:
    a communication portion that transmits notification information for notifying the power transmitting device or the external device which of the first mode and the second mode is set.

6. The control device according to claim 1, wherein:
    the control portion includes a setting register that stores a setting indicating which of the first mode and the second mode is set, and
    the setting register is supplied with a power supply voltage that is based on a battery voltage of the battery so as to operate.

7. The control device according to claim 1, wherein:
    the control portion includes
        a charging system control portion that is supplied with a power supply voltage that is based on an output voltage of the power receiving portion so as to operate, and
        a discharging system control portion that is supplied with a power supply voltage that is based on a battery voltage of the battery, and
    the discharging system control portion controls the discharging operation of the discharging portion.

8. The control device according to claim 1, wherein the control portion:
    stops the discharging operation by turning off the discharging operation of the discharging portion when landing of the power receiving device is detected, and
    turns off the discharging operation of the discharging portion in a normal power transmission period in which the power transmitting device performs normal power transmission.

9. The control device according to claim 1, wherein the control portion:
    starts discharging of a capacitor that is charged based on the power received by the power receiving portion when the output voltage of the power receiving portion has decreased below a judgement voltage, and
    starts the discharging operation of the discharging portion when a charge voltage of the capacitor has decreased below a threshold voltage.

10. The control device according to claim 1, wherein:
    the power transmitting device performs intermittent power transmission for removal detection, and the start-up period is longer than an interval between periods of the intermittent power transmission for removal detection.

11. The control device according to claim 1, wherein the control portion, when the power transmitting device succeeded in landing detection and has made a response to the power receiving device, sets the operation mode to the second mode based on the response.

12. The control device according to claim 1, further comprising:
a load modulation portion that transmits communication data to the power transmitting device through load modulation,
wherein the load modulation portion transmits notification information for notifying the power transmitting device which of the first mode and the second mode is set, as the communication data.

13. A power receiving device comprising the control device according to claim 1.

14. An electronic apparatus comprising the control device according to claim 1.

15. A power receiving device comprising:
a power supply portion that is capable of charging a battery using power received from a power transmitting device, and is capable of performing a power supply operation in which power is supplied to a power supply target using power discharged from the battery; and
a control portion that is configured to:
turn on the power supply operation of the power supply portion when an operation mode of the control portion is set to a first mode when the power supply portion is removed from the power transmitting device, and turn off the power supply operation of the power supply portion when the operation mode of the control portion is set to a second mode when the power supply portion is removed from the power transmitting device, wherein:
the power supply portion charges the battery based on the power received by a power receiving portion contactlessly received from the power transmitting device,
the power supply portion includes:
a charging portion that charges the battery based on the power received by the power receiving portion, and
a discharging portion that performs an operation of discharging the battery and supplies the power discharged from the battery to the power supply target, and
the control portion, when the operation mode is set to the first mode, starts the discharging operation by turning on the discharging operation of the discharging portion after a start-up period of the discharging operation has elapsed, the start-up period being initiated by a decrease in an output voltage of the power receiving portion.

* * * * *